United States Patent
Ohshiba et al.

(10) Patent No.: US 10,290,845 B2
(45) Date of Patent: May 14, 2019

(54) ENERGY STORAGE APPARATUS

(71) Applicant: GS Yuasa International Ltd., Kyoto-Shi, Kyoto (JP)

(72) Inventors: Masashi Ohshiba, Kyoto (JP); Hiroyasu Koyama, Kyoto (JP); Kazuya Fujisawa, Kyoto (JP); Yuta Mizukawa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 493 days.

(21) Appl. No.: 14/675,186

(22) Filed: Mar. 31, 2015

(65) Prior Publication Data
US 2015/0280189 A1    Oct. 1, 2015

(30) Foreign Application Priority Data
Mar. 31, 2014 (JP) .................. 2014-072874

(51) Int. Cl.
| | |
|---|---|
| H01M 2/10 | (2006.01) |
| H01M 2/12 | (2006.01) |
| H01M 2/34 | (2006.01) |
| H01M 10/42 | (2006.01) |
| H01M 2/30 | (2006.01) |

(52) U.S. Cl.
CPC ....... *H01M 2/1094* (2013.01); *H01M 2/1066* (2013.01); *H01M 2/1077* (2013.01); *H01M 2/1252* (2013.01); *H01M 2/34* (2013.01); *H01M 10/4257* (2013.01); *H01M 2/30* (2013.01)

(58) Field of Classification Search
CPC ........ H01M 2/30; H01M 2/34; H01M 2/1066; H01M 2/1077; H01M 2/1252; H01M 2/1094
USPC .......................................... 429/100, 149-163
See application file for complete search history.

(56) References Cited

U.S. PATENT DOCUMENTS

| | | | |
|---|---|---|---|
| 2003/0059669 A1 | 3/2003 | Mittal et al. | |
| 2010/0073005 A1 | 3/2010 | Yano | |
| 2011/0101920 A1* | 5/2011 | Seo ..................... | B60L 11/1861 320/127 |
| 2011/0174556 A1 | 7/2011 | Hermann | |

(Continued)

FOREIGN PATENT DOCUMENTS

| | | |
|---|---|---|
| EP | 2475028 A1 | 7/2012 |
| JP | S34-018527 U | 11/1959 |

(Continued)

OTHER PUBLICATIONS

Extended Search Report issued in European Application No. 15160708.2, dated Sep. 25, 2015.

(Continued)

*Primary Examiner* — Osei K Amponsah
(74) *Attorney, Agent, or Firm* — Michael Best & Friedrich LLP

(57) ABSTRACT

An energy storage apparatus includes: one or more energy storage devices; and an outer covering which houses the one or more energy storage devices. The outer covering has a discharge portion forming a discharge path which discharges a substance generated in an inside of the energy storage apparatus toward outside of the outer covering in a first direction. An inner wall surface of the discharge portion includes a first wall surface inclined with respect to the first direction.

19 Claims, 18 Drawing Sheets

(56) References Cited

U.S. PATENT DOCUMENTS

| | | | |
|---|---|---|---|
| 2012/0164490 A1* | 6/2012 | Itoi | H01M 2/105 429/7 |
| 2012/0328918 A1 | 12/2012 | Kim | |
| 2013/0004813 A1 | 1/2013 | Kim | |
| 2015/0125720 A1 | 5/2015 | Fujii et al. | |

FOREIGN PATENT DOCUMENTS

| | | | | |
|---|---|---|---|---|
| JP | S36-023444 U | | 9/1961 | |
| JP | S63-159267 U | | 10/1988 | |
| JP | 2003-109565 A | | 4/2003 | |
| JP | 2008-117582 A | | 5/2008 | |
| JP | 2010-080352 A | | 4/2010 | |
| JP | 2010-108788 A | | 5/2010 | |
| JP | 2011-054409 | * | 3/2011 | H01M 2/12 |
| JP | 2011-070871 A | | 4/2011 | |
| JP | 2011-175844 A | | 9/2011 | |
| JP | 2011-251621 | * | 12/2011 | B60K 1/04 |
| JP | 2012-104499 A | | 5/2012 | |
| JP | 2012-221646 A | | 11/2012 | |
| JP | 2013-008673 A | | 1/2013 | |
| JP | 2013-114952 A | | 6/2013 | |
| JP | 2013-171746 A | | 9/2013 | |
| JP | 2013-218790 A | | 10/2013 | |
| WO | WO-2013-161655 A1 | | 10/2013 | |
| WO | WO-2014-024433 A1 | | 2/2014 | |

OTHER PUBLICATIONS

Office Action issued in Japanese Patent Application No. 2014-072874, dated Jun. 6, 2017.
Office Action issued in Japanese Patent Application No. 2014-072874, dated Sep. 5, 2017.

\* cited by examiner

FIG. 4
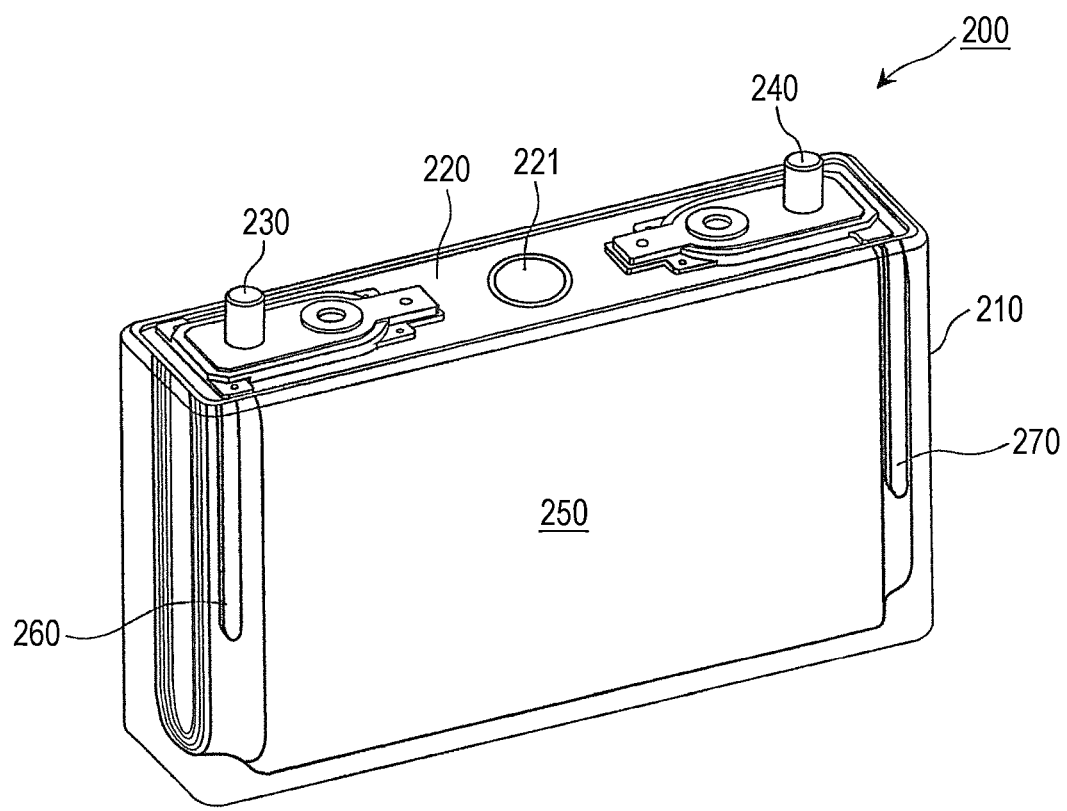
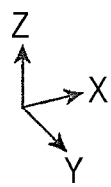

ENERGY STORAGE APPARATUS

CROSS-REFERENCE TO RELATED APPLICATIONS

This application claims the benefit of Japanese patent application No. 2014-072874, filed on Mar. 31, 2014, which is incorporated by reference.

FIELD

The present invention relates to an energy storage apparatus which includes one or more energy storage devices and an outer covering arranged outside such one or more energy storage devices.

BACKGROUND

Concerning an energy storage apparatus in which energy storage devices are housed in an outer covering, there has been known the configuration in which a discharge portion is formed in the energy storage apparatus for discharging a substance such as a gas or a metal piece generated in the inside of the outer covering to a space outside the outer covering (see JP-A-2010-108788, for example).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the above-mentioned conventional configuration, a substance such as a gas or a metal piece of a high temperature discharged through the discharge portion is emitted to the surrounding around the energy storage apparatus. Thus, there is a possibility that the discharged substance such as a gas or a metal piece of a high temperature adversely affects the surrounding around the energy storage apparatus. That is, in the conventional configuration, when a substance such as a gas or a metal piece of a high temperature is discharged, it may be difficult to prevent the discharged substance from adversely affecting the surrounding around the energy storage apparatus.

An object of the present invention is to provide an energy storage apparatus which can prevent a substance from adversely affecting the surrounding around the energy storage apparatus even when the substance is discharged from the energy storage apparatus.

An energy storage apparatus according to an aspect of the present invention includes: one or more energy storage devices; and an outer covering which houses the one or more energy storage devices, wherein the outer covering has a discharge portion forming a discharge path which discharges a substance generated in an inside of the energy storage apparatus toward outside of the outer covering in a first direction, and an inner wall surface of the discharge portion includes a first wall surface inclined with respect to the first direction.

BRIEF DESCRIPTION OF THE DRAWINGS

The foregoing and other features of the present invention will become apparent from the following description and drawings of an illustrative embodiment of the invention in which:

FIG. 4 shows the inside of an energy storage device according to the embodiment of the present invention in a see-through and perspective manner;

DESCRIPTION OF EMBODIMENTS

Figure 1:
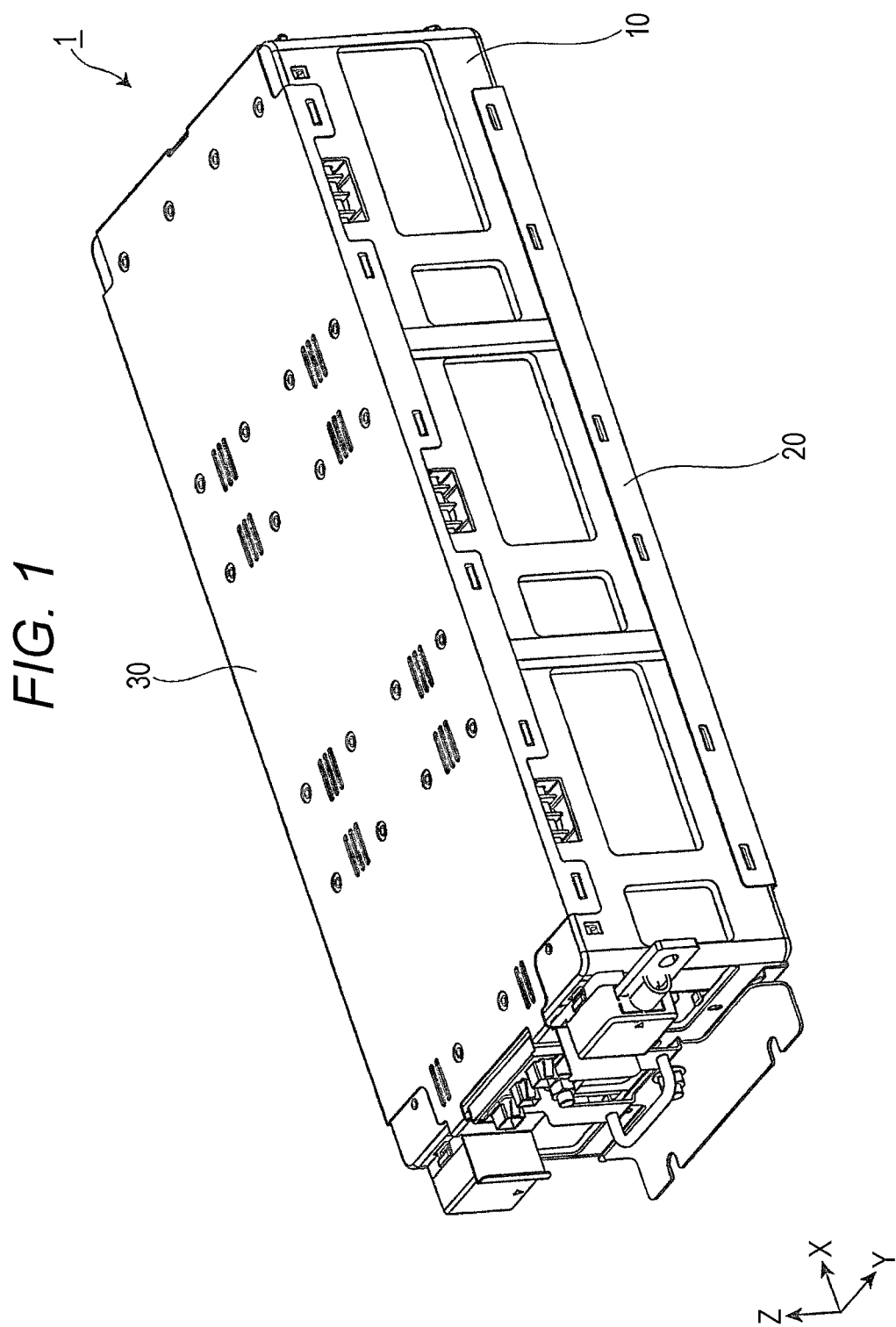
FIG. 1 shows an external appearance of an energy storage apparatus according to an embodiment of the present invention in a perspective manner.

An energy storage apparatus according to a first aspect of the present invention includes: one or more energy storage devices; and an outer covering which houses the one or more energy storage devices, wherein the outer covering has a discharge portion forming a discharge path which discharges a substance generated in an inside of the energy storage apparatus toward outside of the outer covering in a first direction, and an inner wall surface of the discharge portion includes a first wall surface inclined with respect to the first direction.

With this configuration, the first wall surface which forms a part of an inner wall surface of the discharge portion is inclined with respect to the first direction which is directed toward outside of the outer covering and hence, a substance such as a gas or a metal piece of a high temperature generated in a space formed in the inside of the outer covering flows along at least the first wall surface. In this manner, at least a portion of the flow of a substance which flows in the first direction can be made to flow in the direction inclined with respect to the first direction and hence, a moving distance from a generation source of the substance can be extended. Accordingly, it is possible to reduce an adverse effect exerted on the surrounding of the energy storage apparatus by the substance.

Electric equipment may be arranged on a side of the outer covering on an outlet side of the discharge portion.

With this configuration, even when the electric equipment is arranged on a side of the outer covering of the energy storage apparatus on an outlet side of the discharge portion, a substance such as a gas or a metal piece of a high temperature can be discharged in the direction inclined in the first direction of the outer covering. Accordingly, it is possible to prevent the gas or the metal piece of a high temperature from being discharged in a concentrated manner toward the electric equipment from the outlet of the discharge portion thus reducing an adverse effect that a gas of a high temperature is discharged to the electric equipment in a concentrated manner.

The inner wall surface of the discharge portion may include a second wall surface which faces the first wall surface, and an angle which the first wall surface makes with respect to the first direction may differ from an angle which the second wall surface makes with respect to the first direction.

With this configuration, the angle which the first wall surface makes with respect to the first direction differs from the angle which the second wall surface makes with respect to the first direction and hence, the center of a discharge path in the discharge portion is inclined with respect to the first direction. Accordingly, a substance generated in the inside of the energy storage apparatus can be easily discharged at an angle inclined with respect to the first direction. Accordingly, a moving distance from the generation source of the substance can be extended. Accordingly, it is possible to reduce an adverse effect exerted on the surrounding of the energy storage apparatus by the substance.

The discharge portion may be formed in a space formed in the inside of the outer covering.

With this configuration, even when a discharge portion is not provided outside the outer covering, a substance generated in the inside of the outer covering can be easily discharged at an angle inclined with respect to the first direction. In this manner, it is possible to realize an energy storage apparatus having a compact shape provided with the discharge portion for discharging a substance even when a discharge portion projecting from the outer covering is not provided. That is, it is possible to realize both the forming of the outer covering in a compact shape and the reduction of an adverse effect exerted on the surrounding of the energy storage apparatus by a substance.

The discharge portion may be formed at an upper portion of a side surface of the outer covering so as to discharge the substance in a horizontal direction as the first direction, and the first wall surface is inclined upwardly with respect to the first direction.

With this configuration, a substance which passes through the discharge portion can be discharged toward an oblique upward direction which is inclined upwardly with respect to a horizontal direction from the discharge portion formed on the upper portion of the side surface of the outer covering. Accordingly, even when electric equipment is arranged adjacent to the energy storage apparatus, the substance can be discharged in an oblique upward direction and hence, it is possible to prevent the substance from being directly discharged to the electric equipment.

The energy storage apparatus may further include an electric member which is provided on a side of the first wall surface of the discharge portion and is electrically connected with the one or more energy storage devices.

With this configuration, the electric member is provided in a space defined on the side of the first wall surface formed in an inclined manner and hence, the space on the side of the first wall surface can be effectively used.

The one or more energy storage devices may each include a positive terminal and a negative terminal projecting in a predetermined direction, and the electric member may be arranged between the positive terminal and the negative terminal.

With this configuration, the electric member is provided in a space defined between the positive terminal and the negative terminal formed on the energy storage device in a projecting manner in the predetermined direction and hence, the space defined between the positive terminal and the negative terminal can be effectively utilized.

A rib may be formed on an outlet side of the discharge portion in a state where the rib extends along the discharge path and is raised from an inner surface of the discharge portion on the outlet side of the discharge portion.

In this manner, the rib is formed along the discharge path on the outlet side of the discharge portion and hence, the strength of the discharge portion on the outlet side can be enhanced without obstructing the flow of a substance when the substance is discharged.

The rib does not need to be brought into contact with a surface which faces the inner surface on which the rib is formed.

Accordingly, it is possible to prevent vibrations and an impact transferred to the rib from being transferred to the surface which faces the inner surface on which the rib is formed. Accordingly, it is possible to prevent rupture of the surface which faces the inner surface on which the rib is formed or rupture of the rib per se due to vibrations or an impact.

According to the aspects of the invention, even when a substance is discharged from the energy storage apparatus, it is possible to prevent the substance from adversely affecting the periphery of the energy storage apparatus.

Hereinafter, an energy storage apparatus according to an embodiment of the present invention is described with reference to drawings. The embodiment described hereinafter describes preferred specific examples of the present invention. Numerical values, shapes, materials, components, the arrangement positions and connection states of the components and the like are merely examples, and these are not intended to be used for limiting the present invention.

Further, out of the components in the embodiment described hereinafter, components which are not described in the independent claim describing an uppermost concept are described as optional components.

Embodiment

Firstly, the configuration of an energy storage apparatus 1 is described.

Figure 2:
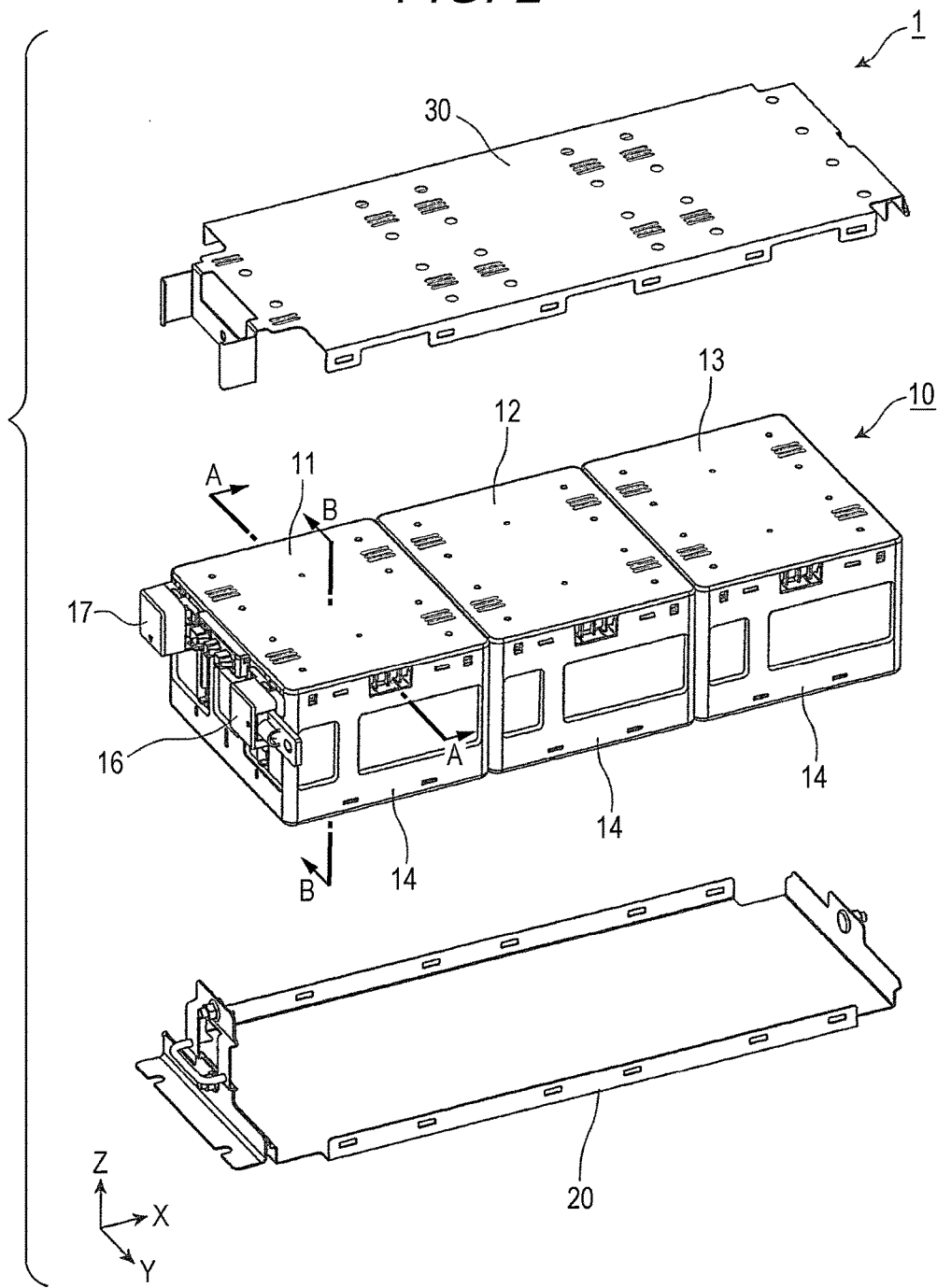
FIG. 2 shows components of the energy storage apparatus according to the embodiment of the present invention in an exploded and perspective manner.

FIG. 1 shows an external appearance of the energy storage apparatus 1 according to an embodiment of the present invention in a perspective manner. FIG. 2 shows components of the energy storage apparatus 1 according to the embodiment of the present invention in an exploded and perspective manner.

In these figures, the Z axis direction is indicated as the vertical direction, and the description is made hereinafter using the Z axis direction as the vertical direction. However, there may be also a case where the Z axis direction does not indicate the vertical direction depending on a use mode and hence, the Z axis direction is not limited to the vertical direction. The same goes for drawings described hereinafter.

The energy storage apparatus 1 is a device which can be charged with electricity from the outside or can discharge electricity to the outside. For example, the energy storage apparatus 1 is a battery module of a high voltage used for power storage application or power source application.

As shown in these figures, the energy storage apparatus 1 includes: a module set 10 having a plurality of unit modules 11, 12 and 13; a lower plate 20 and an upper plate 30. The energy storage apparatus 1 may be configured to include only one unit module. Further, the energy storage apparatus 1 may be configured to include a cooling device such as a cooling fan for allowing a cooling medium (air or the like) to flow into the inside of the module set 10 at an end portion thereof on a plus side in the X axis direction, for example.

The module set 10 includes the plurality of unit modules 11, 12 and 13 arranged in a row in the X-axis-direction. The unit module 11 includes: a positive external terminal cover 16 which is a cover for a positive external terminal described later; and a negative external terminal cover 17 which is a cover for a negative external terminal described later. The energy storage apparatus 1 is charged with electricity from the outside or discharges electricity to the outside through the positive external terminal disposed in the inside of the positive external terminal cover 16 and the negative external terminal disposed in the inside of the negative external terminal cover 17.

The unit modules 11, 12 and 13 are each formed of a rectangular module where one or more energy storage devices are housed in an outer covering 14, and have the substantially same configuration. Among the unit modules 11, 12 and 13, by electrically connecting a positive terminal and a negative terminal of the unit modules arranged adjacent to each other, all energy storage devices in the inside of the unit modules 11, 12 and 13 are connected in series. The detailed configuration of these unit modules 11, 12 and 13 is described later.

The lower plate 20 and the upper plate 30 are members for connecting the plurality of unit modules 11, 12 and 13, wherein the lower plate 20 is a connecting member disposed on a lower side and the upper plate 30 is a connecting member disposed on an upper side. That is, the unit modules 11, 12 and 13 are connected to each other by fixing the unit modules 11, 12 and 13 in a sandwiching manner by the lower plate 20 and the upper plate 30.

To be more specific, the lower plate 20 and the upper plate 30 are formed of a planar member, and are formed using metal or the like, for example. Due to such a configuration, the unit modules 11, 12 and 13 can be fixed firmly and in a stable manner. Outer coverings 14 provided to the plurality of unit modules 11, 12 and 13 are mounted on the lower plate 20.

Next, the detailed configuration of the unit modules 11, 12 and 13 contained in the module set 10 is described. Since the unit modules 11, 12 and 13 have the substantially same configuration, hereinafter, the description is made with respect to the unit module 11, and the description of the configuration of the unit modules 12 and 13 is omitted.

Figure 3:
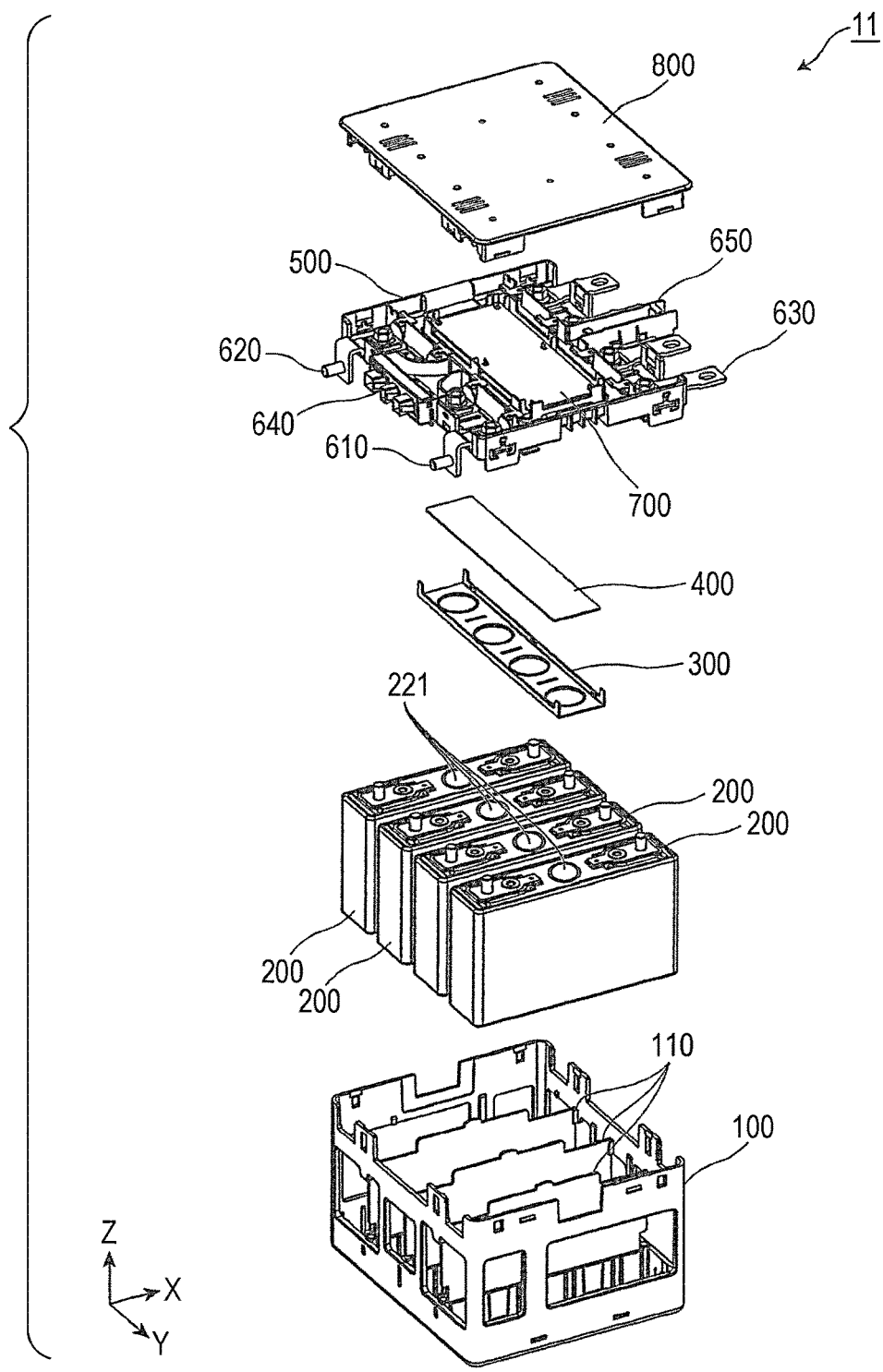
FIG. 3 shows components of a unit module according to the embodiment of the present invention in an exploded and perspective manner.

FIG. 3 shows components of the unit module 11 according to the embodiment of the present invention in an exploded and perspective manner.

As shown in FIG. 3, the unit module 11 includes: the outer covering 14 constituted of an outer covering body 100, an inner lid 500 and a lid member 800; and a plurality of energy storage devices 200 (four energy storage devices 200 in the figure), a flow path forming portion 300, a heat insulation member 400, a printed circuit board 700 and the like which are housed in the outer covering 14. It is not always necessary that the plurality of energy storage devices 200 are housed in the inside of the outer covering 14, and only one energy storage device 200 may be housed in the inside of the outer covering 14.

The outer covering 14 is a container (module case) having a rectangular shape (box shape) which is arranged outside the energy storage devices 200 and constitutes an outer covering of the unit module 11. In the outer covering 14, a plurality of energy storage devices 200, the printed circuit board 700 and the like are arranged at predetermined positions so that the plurality of energy storage devices 200, the printed circuit board 700 and the like are protected from an impact or the like. The outer covering 14 is formed using an insulation material such as a resin, that is, a polycarbonate, a polypropylene (PP) or the like, for example. The outer covering 14 prevents the energy storage devices 200, the printed circuit board 700 and the like from coming into contact with a metal member or the like outside the unit module 11.

The outer covering 14 includes the outer covering body 100, the inner lid 500 and the lid member 800. The outer covering body 100 is a bottomed rectangular cylindrical member which constitutes a body of the outer covering 14. Partition members 110 are arranged in the inside of the outer covering body 100.

The partition member 110 is a member which is arranged on a side of any one of the energy storage devices 200 which the unit module 11 includes. That is, the partition member 110 is a plate-like member which is arranged between two energy storage devices 200 arranged adjacent to each other, and partitions the two energy storage devices 200. In this embodiment, three partition members 110 are arranged between four energy storage devices 200. The partition members 110 are arranged so as not to be in contact with the energy storage devices 200.

The partition member 110 is a member having a heat insulation property, and is formed using a heat insulation material made of mica, for example. To be more specific, as one example of the heat insulation material for forming the partition member 110, a dammar material formed by stacking mica flakes and bonding the mica flakes to each other can be named. That is, the partition member 110 has a function of preventing the transfer of heat generated by the energy storage device 200 to the neighboring energy storage device 200.

The energy storage device 200 is a secondary battery (single battery) which can be charged with electricity or can discharge electricity therefrom. To be more specific, the energy storage device 200 is a non-aqueous electrolytic secondary battery such as a lithium ion secondary battery. The energy storage device 200 is arranged between two partition members 110 disposed in the inside of the outer covering body 100 or between the partition member 110 and a wall surface of the outer covering body 100, and is housed in the inside of the outer covering body 100.

The energy storage devices 200 are each provided with a safety valve 221 on upper surfaces thereof. That is, each energy storage device 200 discharges a substance containing a gas, metal piece or the like toward an upper side through the safety valve 221 when an internal pressure of the energy storage device 200 is elevated. The present invention is not limited to the case where all energy storage devices 200 which the unit module 11 includes are each provided with the safety valve 221, and it is sufficient that at least one energy storage device 200 includes the safety valve 221.

The energy storage device 200 is not limited to a non-aqueous electrolytic secondary battery, and may be a secondary battery other than a non-aqueous electrolytic secondary battery or may be a capacitor.

The flow path forming portion 300 is a portion which forms a discharge path for a substance discharged through the safety valve 221 of the energy storage device 200 in combination with the inner lid 500. That is, the flow path forming portion 300 is a flat-plate-shaped member which is arranged between the plurality of energy storage devices 200 and the inner lid 500 such that the flow path forming portion 300 strides over the plurality of energy storage devices 200. The flow path forming portion 300 is arranged at a position which corresponds to the safety valves 221 of a plurality of energy storage devices 200, and guides a substance such as a gas or a metal piece discharged through a safety valve 221 to the outside.

The heat insulation member 400 is a rectangular flat-plate-shaped heat insulation member which is arranged between the printed circuit board 700 and the energy storage device 200 which are electric members, and is arranged in the inside of the discharge path. That is, the heat insulation member 400 is arranged in the inside of the discharge path formed by the inner lid 500 and the flow path forming portion 300. To be more specific, the heat insulation member 400 is arranged between the inner lid 500 and the flow path forming portion 300, and is arranged at the position which faces the safety valve 221 and at the position which faces the printed circuit board 700. That is, the heat insulation member 400 is arranged between the inner lid 500 and the safety valve 221.

The heat insulation member 400 is detachably mounted on the inner lid 500. That is, the heat insulation member 400 which is formed as a separate body is made detachable from the inner lid 500. To be more specific, the heat insulation member 400 is detachably mounted on the inner lid 500 by being sandwiched between the inner lid 500 and the flow path forming portion 300. Although the heat insulation member 400 may be formed of any material provided that the heat insulation member 400 is a member having a heat insulation property, the heat insulation member 400 is a dammar member, for example.

The inner lid 500 is a flat rectangular member constituting an inner lid of the outer covering 14, and is arranged above the plurality of energy storage devices 200. The inner lid 500 is a flow path arrangement portion arranged in a discharge path. To be more specific, the inner lid 500 is arranged at a position which faces the safety valves 221, and holds the printed circuit board 700. That is, the inner lid 500 is arranged between the safety valves 221 and the printed circuit board 700, and has a function of preventing a substance discharged through the safety valve 221 from reaching the printed circuit board 700.

To be more specific, the inner lid 500 is arranged between the energy storage devices 200, the flow path forming portion 300, and the heat insulation member 400, and the printed circuit board 700. In this manner, the inner lid 500 is arranged on a safety valve 221 side of the energy storage devices 200 and hence, the inner lid 500 also has a function of restricting the movement of the energy storage devices 200 in the direction toward the safety valve 221 side in the inside of the outer covering body 100. That is, the inner lid 500 is fitted in the inside of the outer covering body 100 and presses the plurality of energy storage devices 200 from above thus fixing the plurality of energy storage devices 200 to the outer covering body 100.

In this manner, the inner lid 500 forms the discharge path, holds the printed circuit board 700 and, further, plays a roll of fixing the energy storage devices 200 to the outer covering body.

In the inside of the inner lid 500, a positive external terminal 610, a negative external terminal 620, a bus bar 630, an external wiring connecting part 640, and a wiring route forming part 650 are arranged. The detailed description of these parts will be made later.

The printed circuit board 700 is an electric member which is electrically connected to at least one energy storage device 200 out of the energy storage devices 200 which the unit module 11 includes. To be more specific, the printed circuit board 700 is a board capable of acquiring, monitoring and controlling states of the plurality of energy storage devices 200, and the printed circuit board 700 is connected to positive terminals or negative terminals of a plurality of energy storage devices 200 by wiring (lead lines) 701.

To be more specific, the printed circuit board 700 is a control circuit board for monitoring a charge state and a discharge state (a battery state such as a voltage or a temperature) and the like of the plurality of energy storage devices 200. The printed circuit board 700 includes, for example, a control circuit (not shown in the drawings) for performing such monitoring, turning on/off of relays and the communication with other equipment.

The printed circuit board 700 is arranged above the inner lid 500, and is arranged to be covered by the lid member 800. That is, the printed circuit board 700 is arranged such that the printed circuit board 700 is protected by the inner lid 500 and the lid member 800 by being sandwiched between the inner lid 500 and the lid member 800. Further, by integrally mounting the electric components on an upper portion of the energy storage apparatus 1 in this manner, the assembling property and the maintenance property of the energy storage apparatus 1 can be enhanced.

It is not always necessary to provide the printed circuit board 700 to the respective unit modules, and the energy storage apparatus 1 may be also configured such that the printed circuit board 700 is provided to only the unit module 11, for example. The unit module may be also configured such that other electric members such as a fuse are arranged on the inner lid 500 as an electric member instead of the printed circuit board 700.

The lid member 800 is a member constituting a lid of the outer covering 14, and is a flat rectangular member which closes an opening of the outer covering body 100.

To be more specific, the plurality of energy storage devices 200, the flow path forming portion 300, the heat insulation member 400, the inner lid 500, the printed circuit board 700 and the like are arranged in the inside of the outer covering body 100 in this order, and an opening of the outer covering body 100 is closed by the lid member 800. By arranging the plurality of energy storage devices 200 which are heavy weight members in a lowermost portion of the unit module 11 in this manner, the stability of the unit module 11 can be enhanced.

Next, the components which the unit module 11 includes are described in detail. Firstly, the configuration of the energy storage device 200 is described in detail.

FIG. 4 shows the inside of an energy storage device 200 according to the embodiment of the present invention in a see-through and perspective manner.

As shown in the figure, the energy storage device 200 includes a container 210, a positive terminal 230 and a negative terminal 240. The container 210 includes a container lid 220 which forms an upper wall thereof. In the inside of the container 210, an electrode assembly 250, a positive current collector 260 and a negative current collector 270 are arranged. The safety valve 221 is formed on the container lid 220. A liquid such as an electrolyte solution is filled in the container 210. However, the illustration of the liquid is omitted.

The container 210 is constituted of a bottomed container body made of metal and having a rectangular cylindrical shape, and a metal made container lid 220 which closes an opening of the container body. The container 210 is formed into a sealed container by welding the container lid 220 and the container body after accommodating the electrode assembly 250 and the like in the inside of the container 210. Although a material for forming the container 210 is not particularly limited, the material for forming the container 210 may preferably be weldable metal such as stainless steel or aluminum, for example.

The electrode assembly 250 includes a positive electrode, a negative electrode and a separator, and is a power generating element which can store electricity. To be more specific, the electrode assembly 250 is an electrode assembly formed by winding, in an elliptic cylindrical shape as a whole, a layered body where a separator is sandwiched between the positive electrode and the negative electrode. The electrode assembly 250 may be a stacked-type electrode assembly formed by stacking plate-shaped electrode plates.

The positive electrode is an electrode plate where a positive electrode active substance layer is formed on a surface of an elongated strip-shaped conductive positive current collector foil made of aluminum, an aluminum alloy or the like. The negative electrode is an electrode plate where a negative electrode active substance layer is formed on a surface of an elongated strip-shaped conductive negative current collector foil made of copper, a copper alloy or the like. The separator is a sheet having minute pores. The positive electrode, the negative electrode and the separator which are used in the energy storage device 200 are not particularly different from positive electrodes, negative electrodes and separators used conventionally. As long as the performance of the energy storage device 200 is not impaired, known materials can be used. As long as the performance of the energy storage device 200 is not impaired, the kind of electrolyte solution (non-aqueous electrolyte) filled in the container 210 is not particularly limited, and various electrolyte solutions can be selected.

The positive terminal 230 is an electrode terminal which is electrically connected to a positive electrode of the electrode assembly 250 by way of a positive current collector 260, and the negative terminal 240 is an electrode terminal which is electrically connected to a negative electrode of the electrode assembly 250 by way of a negative current collector 270. Both the positive terminal 230 and the negative terminal 240 are mounted on the container lid 220. That is, the positive terminal 230 and the negative terminal 240 are metal-made electrode terminals for leading out electricity stored in the electrode assembly 250 to an external space of the energy storage device 200 and leading electricity into an inner space of the energy storage device 200 for storing electricity in the electrode assembly 250 respectively.

To be more specific, the positive terminal 230 of the energy storage device 200 arranged on a positive external terminal 610 side among the plurality of energy storage devices 200 provided to the energy storage apparatus 1 is connected to the positive external terminal 610, and the negative terminal 240 of the energy storage devices 200 is connected to the positive terminal 230 of the neighboring energy storage device 200. In the same manner, the negative terminal 240 of the energy storage device 200 arranged on a negative external terminal 620 side among the plurality of energy storage devices 200 is connected to the negative external terminal 620, and the positive terminal 230 of the energy storage device 200 is connected to the negative terminal 240 of the neighboring energy storage device 200. The positive terminals 230 or the negative terminals 240 of other energy storage devices 200 are connected to the negative terminals 240 or the positive terminals 230 of the neighboring energy storage devices 200.

The positive current collector 260 is a member having conductivity and rigidity which is arranged between the positive electrode of the electrode assembly 250 and a side wall of the container 210, and is electrically connected to the positive terminal 230 and the positive electrode. The positive current collector 260 is formed using aluminum, an aluminum alloy or the like in the same manner as the positive current collector foil of the positive electrode. The negative current collector 270 is a member having conductivity and rigidity which is arranged between the negative electrode of the electrode assembly 250 and the side wall of the container 210, and is electrically connected to the negative terminal 240 and the negative electrode of the electrode assembly 250. The negative current collector 270 is formed using copper, a copper alloy or the like in the same manner as the negative current collector foil of the negative electrode.

As shown in FIG. 2, the positive external terminal cover 16 in which the positive external terminal 610 is arranged and the negative external terminal cover 17 in which the negative external terminal 620 is arranged are arranged on a side surface of the energy storage apparatus 1 on a minus side in the X axis direction. That is, the positive external terminal 610 and the negative external terminal 620 are arranged on the side surface of the energy storage apparatus 1 on a minus side in the X axis direction. This configuration can be realized as the result of arranging the plurality of energy storage devices 200 next to each other in the Y axis direction as shown in FIG. 3. That is, in connecting the plurality of energy storage devices 200 arranged next to each other in the Y axis direction in series by the bus bar 630, it is possible to provide one energy storage device 200 where the positive terminal 230 is arranged on a minus side in the X axis direction and another energy storage device 200 where the negative terminal 240 is arranged on a minus side in the X axis direction. Due to such a configuration, by directly connecting the positive terminal 230 of one energy storage device 200 to the positive external terminal 610 and by directly connecting the negative terminal 240 of another energy storage device 200 to the negative external terminal 620, the positive external terminal 610 and the negative external terminal 620 can be arranged on the side surface of the energy storage apparatus 1 on a minus side in the X axis direction. In this manner, the positive external terminal 610 and the negative external terminal 620 can be collectively arranged on the side surface of the energy storage apparatus 1 on a minus side in the X axis direction (that is, one side surface of the energy storage apparatus 1) and hence, in connecting a plurality of energy storage apparatuses 1, compared to the case where the positive external terminal and the negative external terminal are arranged on a plurality of side surfaces of the energy storage apparatus 1, the length of the bus bar can be shortened or the structure of the bus bar can be simplified. Further, the bus bar connection operation can be performed only on a minus side in the X axis direction of a plurality of energy storage apparatuses 1 and hence, the operational efficiency can be enhanced.

Next, the flow path forming portion 300 is described in detail.

Figure 5:
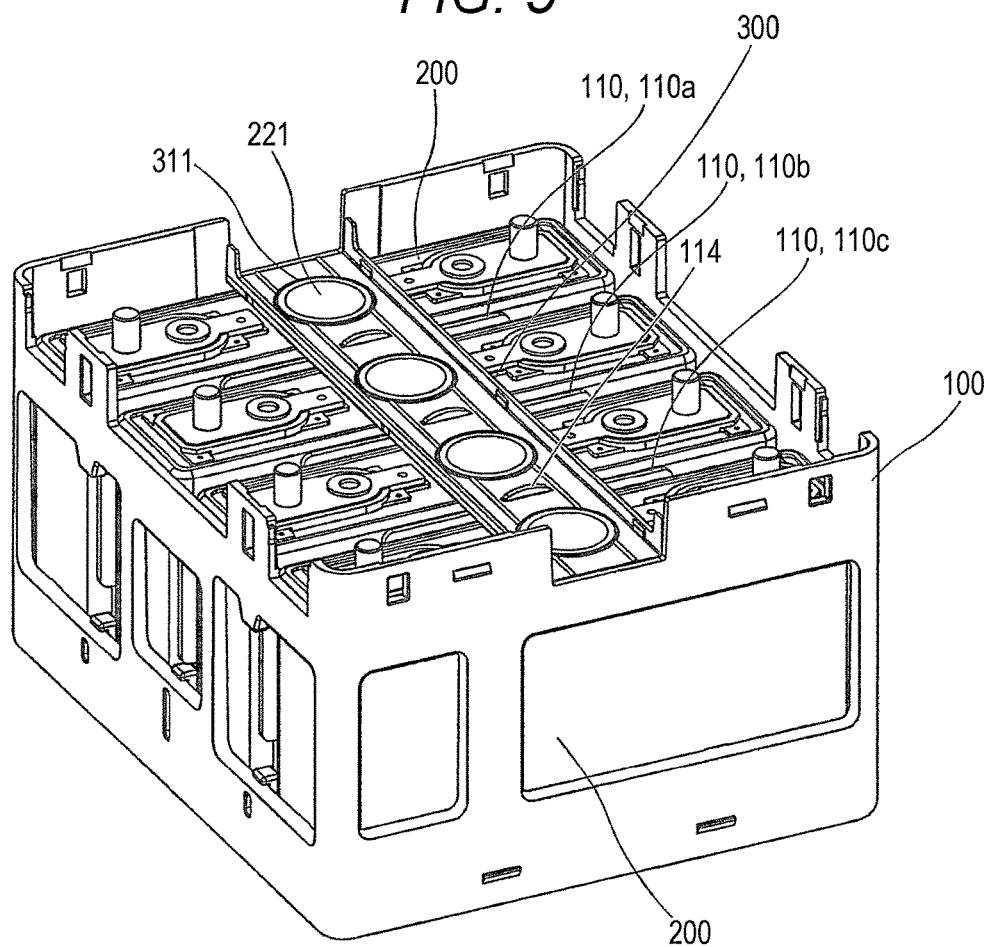
FIG. 5 shows the configuration where a flow path forming portion according to the embodiment of the present invention is arranged on the energy storage device and a partition member in a perspective manner.

FIG. 5 shows the configuration where the flow path forming portion 300 according to the embodiment of the present invention is arranged on the energy storage device 200 and the partition member 110 in a perspective manner.

The flow path forming portion 300 is a member which forms a discharge path together with the inner lid 500. The flow path forming portion 300 is formed of a heat resistant member. That is, the flow path forming portion 300 is formed of a member which has higher heat resistance than the outer covering body 100 of the outer covering 14. To be more specific, the flow path forming portion 300 is formed using a heat resistant resin such as a thermosetting resin. In this embodiment, the flow path forming portion 300 is formed using a phenol resin.

The material for forming the flow path forming portion 300 is not limited to a phenol resin, and it is possible to use a thermosetting resin such as a urea resin, a melamine resin, an unsaturated polyester resin, a diallyl phthalate resin, an epoxy resin, a silicon resin, an alkyd resin, a polyimide resin, a polyamino-bismaleimide resin, a casein resin, a furan resin or a urethane resin. The flow path forming portion 300 may be formed of a heat resistant member made of ceramic in place of a member made of a resin.

Safety valve openings 311 are formed in the flow path forming portion 300 at positions which face the safety valves 221 of the energy storage devices 200. That is, as shown in FIG. 5, four safety valve openings 311 are formed in the flow path forming portion 300 corresponding to the safety valves 221 of four energy storage devices 200. The energy storage devices 200 are accommodated in the inside of the outer covering body 100 in a state where the safety valves 221 face upward, and the flow path forming portion 300 is arranged above the energy storage devices 200.

The safety valve opening 311 is a through hole having a circular shape which is formed larger than the safety valve 221 of the energy storage device 200. When a substance is discharged through the safety valve 221, the safety valve opening 311 makes the substance pass through the flow path forming portion 300 toward an upper side of the flow path forming portion 300 from a lower side of the flow path forming portion 300.

Next, the components around the inner lid 500 are described.

Figure 6:
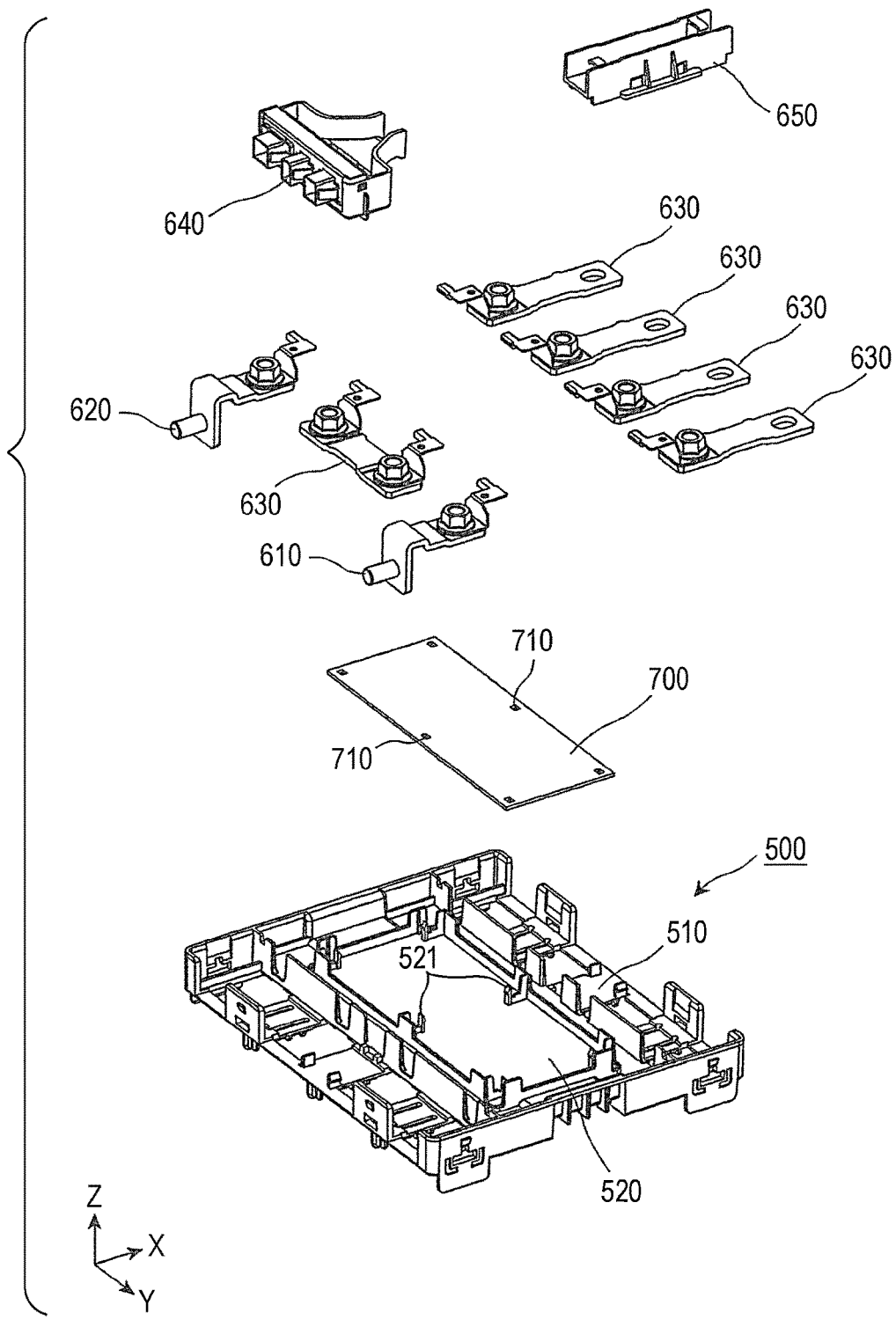
FIG. 6 shows components of the unit module according to the embodiment of the present invention around an inner lid in an exploded and perspective manner.
Figure 7:
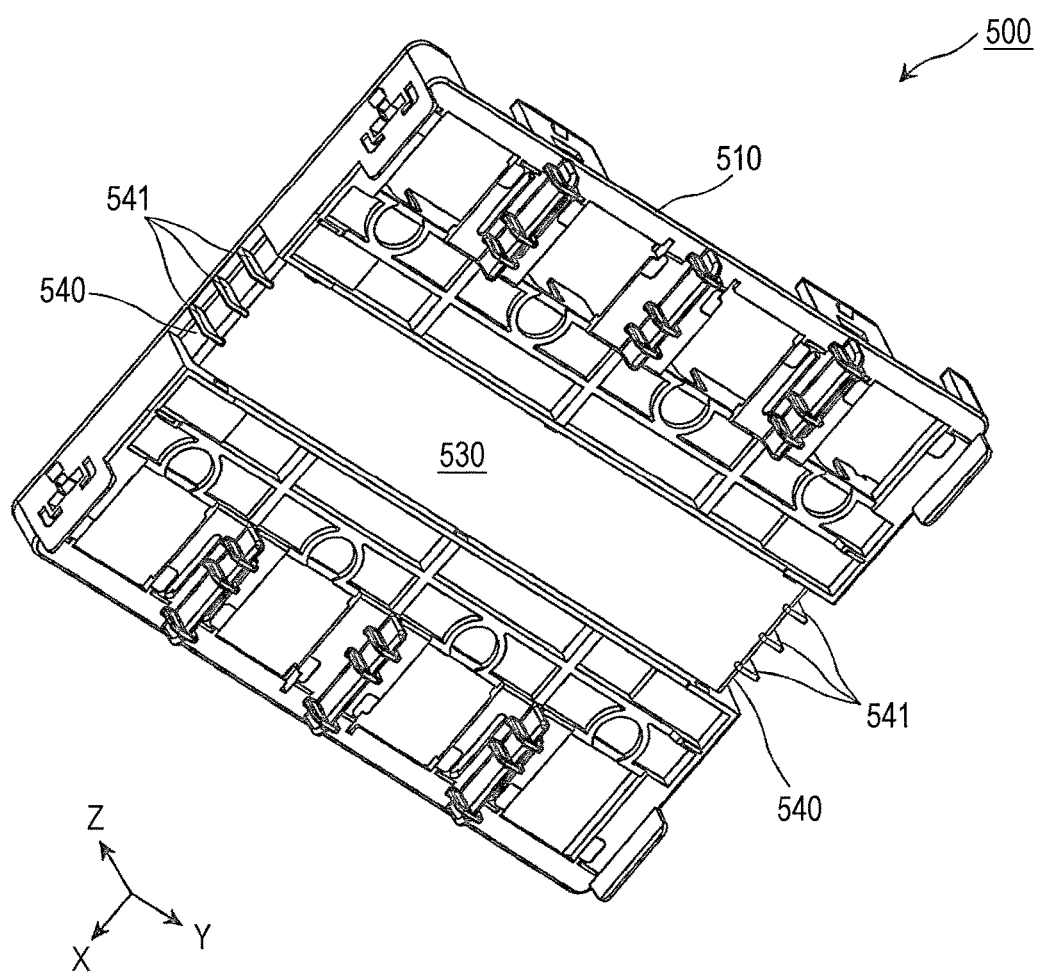
FIG. 7 shows the configuration of the inner lid according to the embodiment of the present invention in a perspective manner.

FIG. 6 shows components of the unit module 11 according to the embodiment of the present invention around the inner lid 500 in an exploded and perspective manner. FIG. 7 shows the configuration of the inner lid 500 according to the embodiment of the present invention in a perspective manner. To be more specific, FIG. 7 shows the configuration of the inner lid 500 as viewed from below in a perspective manner.

Figure 8:
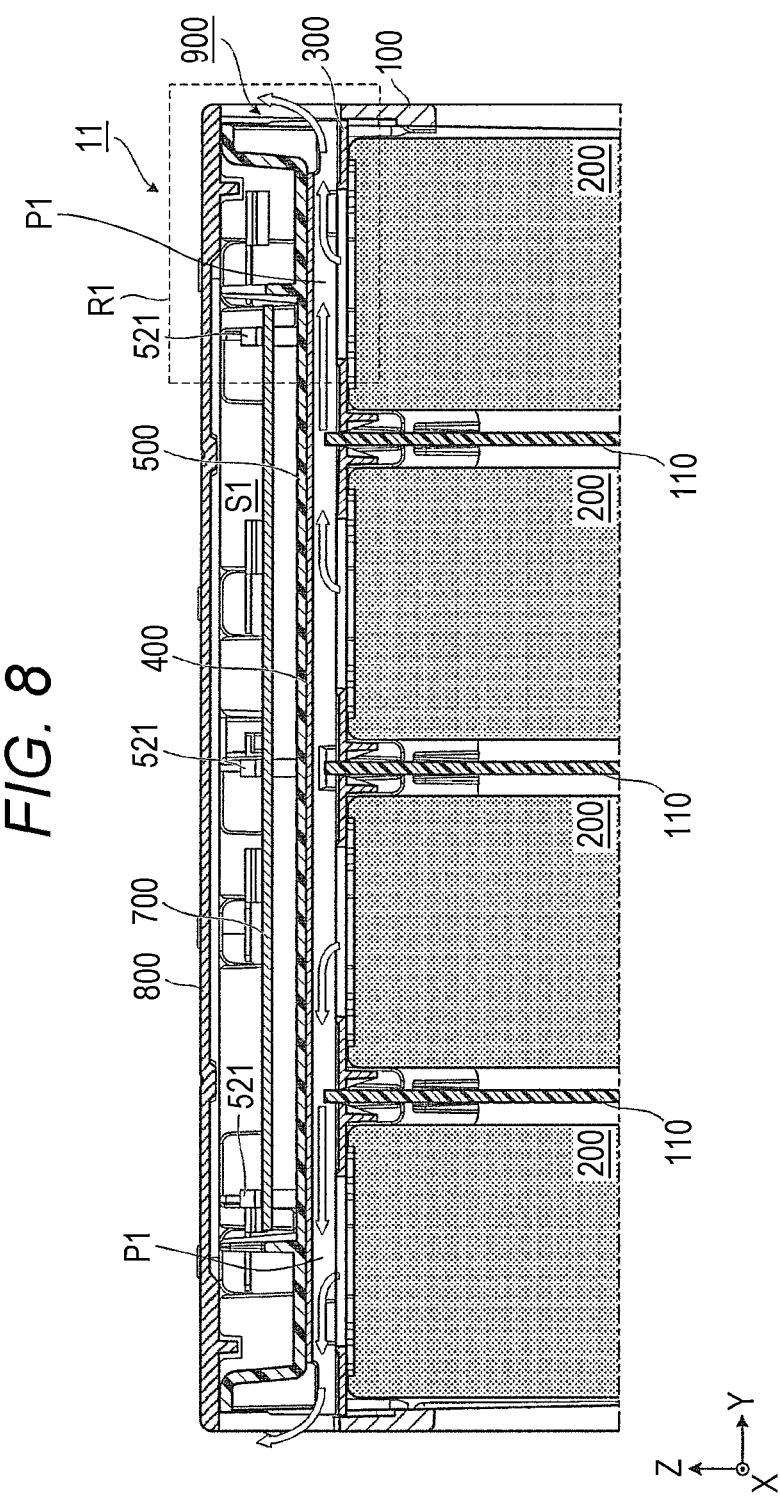
FIG. 8 shows a cross section of the unit module according to the embodiment of the present invention taken along Y-Z plane.
Figure 9:
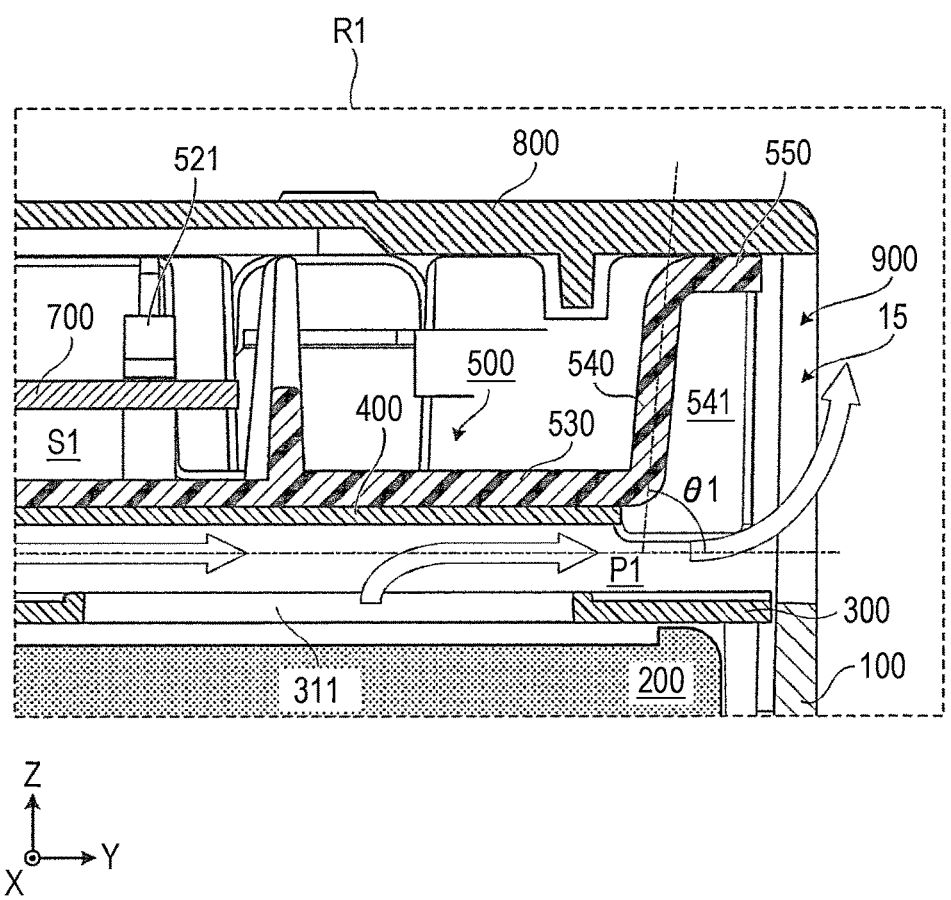
FIG. 9 shows a region R1 surrounded by a broken line in the cross section of the unit module shown in FIG. 8 in an enlarged manner.
Figure 10:
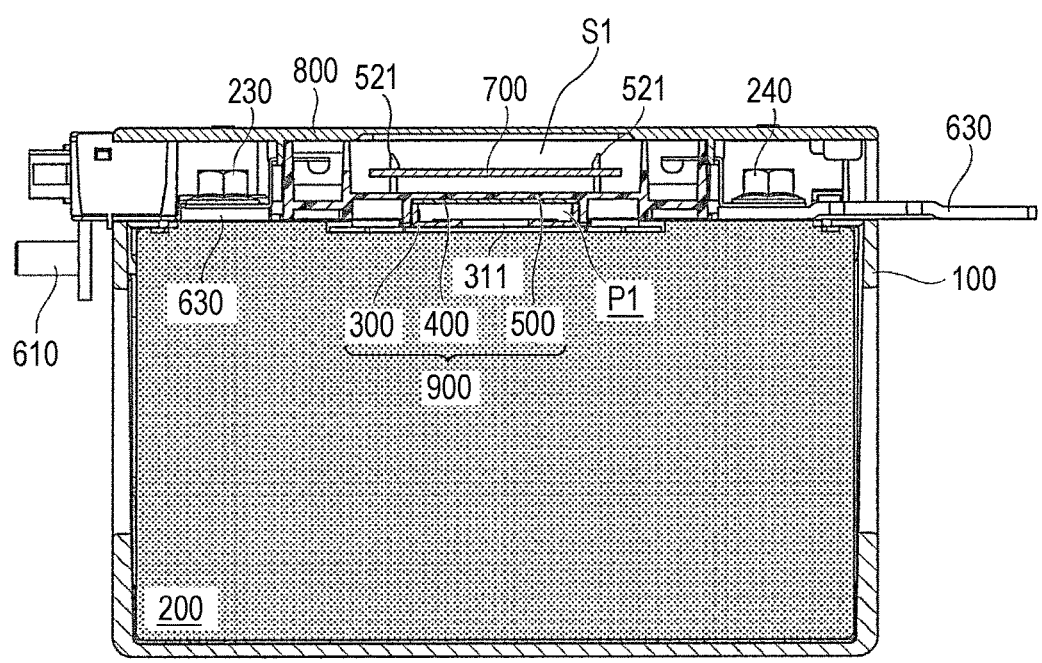
FIG. 10 shows a cross section of the unit module according to the embodiment of the present invention taken along X-Z plane.

FIG. 8 shows a cross section of the unit module according to the embodiment of the present invention taken along Y-Z plane. To be more specific, FIG. 8 is a view showing the cross section of the unit module 11 shown in FIG. 2 taken along line A-A. FIG. 9 shows a region R1 surrounded by a broken line in FIG. 8 showing the cross section of the unit module in an enlarged manner. FIG. 10 shows a cross section of the unit module according to the embodiment of the present invention taken along X-Z plane. To be more specific, FIG. 10 shows a cross section of the unit module 11 shown in FIG. 2 taken along line B-B.

Firstly, as shown in FIG. 6, the positive external terminal 610, the negative external terminal 620, the bus bars 630, the external wiring connecting part 640, and the wiring route forming part 650 are arranged on the inner lid 500 besides the printed circuit board 700.

The positive external terminal 610 is an external terminal on a positive electrode side arranged in the inside of the positive external terminal cover 16 shown in FIG. 2, and the negative external terminal 620 is an external terminal on a negative electrode side arranged in the inside of the negative external terminal cover 17 shown in FIG. 2. The positive external terminal 610 and the negative external terminal 620 are electrode terminals used for charging the energy storage apparatus 1 with electricity from the outside and for discharging electricity to the outside from the energy storage apparatus 1. That is, the energy storage apparatus 1 is charged with electricity from the outside and discharges electricity to the outside therefrom through the positive external terminal 610 and the negative external terminal 620.

The bus bar 630 is a member which is arranged on the inner lid 500. The bus bar 630 is a conductive member made of metal or the like, and is a connection member which electrically connects the plurality of energy storage devices 200 to each other. To be more specific, in the energy storage devices 200 arranged adjacent to each other, the bus bar 630 connects the positive terminal or the negative terminal of one energy storage device 200 and the negative terminal or the positive terminal of another energy storage device 200.

The external wiring connecting part 640 is a connector connected to external wiring, and connects the external wiring and wiring which is connected to at least one energy storage device 200 out of the plurality of energy storage devices 200.

The wiring route forming part 650 is a member which is arranged between two unit modules so as to straddle between the two unit modules, and forms a wiring path which allows wiring which straddles between two unit modules to pass therethrough.

Next, the inner lid 500 is described in detail.

The inner lid 500 has an inner lid body portion 510 on which the bus bar 630 and the like are arranged. The inner lid 500 has a flat planar board mounting portion 520 on which the printed circuit board 700 is mounted at a center position of the inner lid body portion 510, and also has board supporters 521 which constitute projecting portions projecting from the board mounting portion 520.

To be more specific, as shown in FIG. 10, the board supporters 521 are inserted into board openings 710 formed in the printed circuit board 700, and the printed circuit board 700 is mounted on the board mounting portion 520 so that the printed circuit board 700 is fixed onto the inner lid 500. As shown in FIG. 6, in this embodiment, the inner lid 500 has six board supporters 521, and the printed circuit board 700 is fixed onto the inner lid 500 by inserting the six board supporters 521 into six board openings 710 formed on the printed circuit board 700. The number of board openings 710 is not limited, and the number of board supporters 521 is also not limited.

As shown in FIG. 7, the inner lid 500 has a flat portion 530 and inclined portions 540 inclined with respect to the flat portion 530 on a surface thereof on a side opposite to the board mounting portion 520 of the inner lid body portion 510. The flat portion 530 is a flat surface on which the heat insulation member 400 is mounted, and the inclined portion 540 is an inclined surface arranged on both sides of the flat portion 530.

To be more specific, as shown in FIG. 7 to FIG. 9, the inner lid 500 has the flat portion 530, the inclined portions 540 and exit flat portions 550 on a surface thereof which faces the heat insulation member 400, and the heat insulation member 400 is arranged within the flat portion 530. That is, the heat insulation member 400 is arranged within a region of the flat portion 530 without extending over an inclined portion 540 side.

Next, a discharge portion 900 which forms the discharge path P1 is described.

As shown in FIG. 8 to FIG. 10, the discharge path P1 which is a flow path for a substance discharged through the safety valve 221 of the energy storage device 200 is formed by being surrounded by the inner lid 500, the heat insulation member 400 and the flow path forming portion 300. That is, the discharge portion 900 which forms the discharge path P1 is formed by the inner lid 500, the heat insulation member 400 and the flow path forming portion 300. Provided that the heat resistance and the heat insulating property of the inner lid 500 are ensured, the discharge portion 900 does not need to contain the heat insulation member 400. The discharge path P1 extends along a shape of the flow path forming portion 300. That is, the discharge path P1 discharges a substance generated in the inside of the single battery module to spaces on both sides outside the outer covering 14 in the Y axis direction.

The inner wall surface of the discharge portion 900 is constituted of: the heat insulation member 400 mounted on the flat portion 530 of the inner lid 500, the inclined portion 540 of the inner lid 500, and the flow path forming portion 300.

The inner wall surface of the discharge portion 900 on an outlet side includes: an inclined portion 540 (first wall surface) which is inclined with respect to the Y axis direction; and an opposedly facing surface 320 (second wall surface) of the flow path forming portion 300 which faces the inclined portion 540. As shown in FIG. 9, the inclined portion 540 is inclined upwardly with respect to the Y axis direction by an inclination angle θ1. On the other hand, the opposedly facing surface 320 extends parallel to the Y axis direction. That is, the inclined portion 540 and the opposedly facing surface 320 differ from each other in an angle with respect to the Y axis direction.

The discharge portion 900 is, in a region where the heat insulation member 400 is arranged, a plate-shaped member where the heat insulation member 400 and the flow path forming portion 300 which is arranged to face the heat insulation member 400 extend in the Y axis direction. That is, the discharge path P1 is, in the region where the heat insulation member 400 is arranged, a space which extends in the Y axis direction while holding the width thereof in the X axis direction and the width thereof in the Z axis direction at respective fixed values.

Further, in the discharge portion 900, outside the heat insulation member 400 in the Y axis direction, the discharge path P1 is formed by making the inclined portion 540 and the flow path forming portion 300 face each other. That is, in the discharge path P1, in the region where the inclined portion 540 is formed, the more outwardly the discharge path P1 extends, the more upwardly the inclined portion 540 is inclined at an inclination angle θ1, and the flow path forming portion 300 is parallel to the Y axis direction. That is, the discharge path P1 is a space which is formed so as to increase a cross-sectional area of a flow path of the discharge path P1 as the discharge path P1 extends outwardly.

Further, in the discharge portion 900, further outside the inclined portion 540 in the Y axis direction, the discharge path P1 is formed by making the exit flat portion 550 and the flow path forming portion 300 face each other. That is, the discharge path P1 is the space which has the larger width in the Z axis direction in the region where the exit flat portion 550 is arranged than the region where the heat insulation member 400 is arranged. Due to such a configuration, in discharging a substance which is discharged through the safety valve 221 of the energy storage device 200 to the space outside the energy storage device 200, the substance can be spread as wide as possible.

The discharge portion 900 is formed so as to discharge a substance into a space on the Y axis direction side at an upper portion of the side surface of the outer covering 14. The inclined portion 540 formed on the discharge portion 900 is inclined upwardly with respect to the Y axis direction. Due to such a configuration, a substance which passes through the discharge portion 900 can be discharged toward an obliquely upward direction which is the direction inclined upwardly with respect to Y axis direction from a discharge port 15 of the discharge portion 900 formed on the upper portion of the side surface of the outer covering 14. Accordingly, even when electric equipment including another energy storage apparatus, an inverter circuit, a converter circuit, a control circuit or the like is arranged adjacent to the energy storage apparatus 1, the substance can be discharged in an oblique upward direction and hence, it is possible to prevent the substance from being directly discharged to the electric equipment.

The inner lid 500, the heat insulation member 400 and the flow path forming portion 300 are arranged in the inside of the outer covering 14. That is, the discharge portion 900 is formed in the space formed in the inside of the outer covering 14. Accordingly, even when at least a portion of the discharge portion is not formed outside the outer covering 14, a substance generated in the inside of the outer covering 14 can be easily discharged along the inclined angle θ1 inclined upwardly with respect to the Y axis direction. In this manner, it is possible to realize the unit module having a compact shape provided with the discharge portion for discharging a substance even when the discharge portion projecting from the outer covering 14 is not formed. That is, the energy storage apparatus 1 of this embodiment can realize both the acquisition of the compact outer covering and the reduction of adverse effect exerted on the surrounding by a substance.

Ribs 541 are arranged on an outlet side of the discharge portion 900 such that the ribs 541 extend along the discharge path P1 and are raised from the inner surfaces of the inclined portion 540 and the exit flat portion 550. In this embodiment, three ribs 541 are arranged on each of the inclined portions 540 on both ends of the discharge portion 900 in the Y axis direction. The ribs 541 are not brought into contact with the flow path forming portion 300 which faces the inclined portion 540 and the exit flat portion 550 where the ribs 541 are formed.

The ribs 541 have a function of reinforcing the strength of the inner lid 500. Three ribs 541 are formed on the discharge port 15 of the discharge portion 900 thus dividing a width of the opening of the discharge port 15 into small divided widths. Accordingly, the ribs 541 also have a function of preventing an accident that a person erroneously inserts his finger into the inside of the discharge portion 900. By forming the ribs 541 as portions projecting from the inclined portions 540 and by arranging the pair of ribs 541 such that the ribs 541 pinch the heat insulation member 400 from both sides in the Y axis direction, the ribs 541 also have a function of restricting the movement of the heat insulation member 400 in the Y axis direction.

Further, the ribs 541 are not brought into contact with the flow path forming portion 300 which the ribs 541 face and hence, it is possible to prevent vibrations and an impact transferred to the ribs 541 from being transferred to the surface of the flow path forming portion 300 which faces the inner surfaces of the inclined portion 540 and the exit flat portion 550 on which the ribs 541 are formed. Accordingly, it is possible to prevent rupture of the flow path forming portion 300 or the ribs 541 by vibrations or an impact. Further, an opening area of the discharge port 15 of the discharge portion 900 can be increased compared to the case where the ribs 541 are brought into contact with the flow path forming portion 300. That is, by adopting the configuration where end portions of the ribs 541 on a lower side are not brought into contact with the flow path forming portion 300, it is possible to acquire both the enhancement of the strength of the discharge portion 900 on an outlet side and the efficient discharge of a substance such as a gas or a metal piece.

As shown in FIG. 8 to FIG. 10, the printed circuit board 700 is arranged in the space S1 defined at the center position of the inner lid body portion 510. That is, the printed circuit board 700 is arranged in the space S1 which is formed on the side of the inclined portion 540 of the discharge portion 900, the space S1 formed between the positive terminal 230 and the negative terminal 240 of the energy storage device 200. In this manner, the printed circuit board 700 is disposed in the space on the side of the inclined portion 540 and hence, it is possible to effectively make use of the space on the side of the inclined portion 540. Further, the printed circuit board 700 is disposed in the space defined between the positive terminal 230 and the negative terminal 240 formed in a projecting manner from the energy storage device 200 and hence, it is possible to effectively make use of the space defined between the positive terminal 230 and the negative terminal 240. To form the unit module in a compact shape by arranging the printed circuit board 700 in vacant spaces of a plurality of energy storage devices 200, the printed circuit board 700 is arranged between the positive terminal 230 and the negative terminal 240 of each energy storage device 200. That is, the printed circuit board 700 is arranged on the side of the energy storage device 200 where the positive terminal 230 and the negative terminal 240 project (that is, above the energy storage device 200).

The safety valve 221 is mounted on each energy storage device 200 on a side where the positive terminal 230 and the negative terminal 240 project. Accordingly, in an attempt to discharge a substance which is discharged through the safety valve 221 toward the outside of the unit module, to prevent the substance from adversely affecting the printed circuit board 700 by heat or the like, it is necessary to prevent the substance from passing through the space S1 where the printed circuit board 700 is arranged. That is, it is necessary to provide the discharge path P1 below the space S1 where the printed circuit board 700 is provided. A plurality of energy storage devices 200 are arranged next to each other in the Y axis direction, and each energy storage device 200 includes the positive terminal 230 and the negative terminal 240 which are arranged in the X axis direction. That is, a space defined between the positive terminals 230 and the negative terminals 240 of the plurality of energy storage devices 200 extends in the Y axis direction. Accordingly, by forming the discharge portion 900 such that the discharge path P1 extends along the Y axis direction, the configuration is realized where the printed circuit board 700 can be arranged by effectively making use of the space defined between the positive terminals 230 and the negative terminals 240, and it is possible to prevent a substance discharged through the safety valve 221 from exerting an adverse effect on the printed circuit board 700. Further, the discharge portion 900 is formed such that the discharge path P1 extends along the Y axis direction and hence, the discharge port 15 (described later) of the discharge portion 900 is formed on a side surface of the energy storage apparatus 1 on a Y axis direction side.

As has been described above, according to the energy storage apparatus 1 according to the embodiment of the present invention, the inclined portion 540 which forms a part of the inner wall surface of the discharge portion 900 on an outlet side is inclined with respect to the Y axis direction of the outer covering 14. Accordingly, a substance generated in the inside of the outer covering 14 such as a gas or a metal piece flows along at least the inclined portion 540. In this manner, it is possible to make at least a part of the flow of the substance which flows along the Y axis direction flow in the direction inclined with respect to the Y axis direction and hence, the moving distance of the substance from the safety valve 221 which is a generation source of the substance can be increased. Accordingly, it is possible to prevent adverse effects exerted on the surrounding of the energy storage apparatus 1 due to discharging of the substance to the outside (for example, distortion or rupture of a product around the energy storage apparatus 1 by heat, rupture of the product due to the impingement of a metal piece, short-circuiting of an electronic circuit by a metal piece or the like).

Further, even when electric equipment is arranged on the side of the discharge portion 900 of the outer covering 14 of the energy storage apparatus 1 on an outlet side, it is possible to discharge a substance such as a gas or a metal piece in the direction inclined toward the Y axis direction of the outer covering 14. Accordingly, the moving distance of a gas or a metal piece from the outlet of the discharge portion 900 to the electric equipment can be increased. That is, it is possible to reduce an adverse effect exerted on the electric equipment by a substance due to discharging of a gas or a metal piece toward the electric equipment while maintaining high energy (for example, distortion or rupture of the electric equipment around the energy storage apparatus 1, rupture of the electric equipment due to the impingement of the metal piece, short-circuiting of a circuit of the electric equipment by the metal piece or the like).

An inclination angle θ1 which the inclined portion 540 makes with respect to the Y axis direction differs from an angle which a surface of the flow path forming portion 300 facing the inclined portion 540 makes with respect to the Y axis direction. To be more specific, the inclined portion 540 is inclined more upwardly toward an outlet side of the discharge path P1, and the surface of the flow path forming portion 300 which faces the inclined portion 540 is parallel to the Y axis direction. Due to such a configuration, in the discharge path P1 on an outlet side of the discharge portion 900, the center of the flow path is inclined upwardly at the inclined portion 540. Accordingly, a substance generated in the inside of the energy storage apparatus 1 can be easily discharged at an angle inclined upwardly with respect to the Y axis direction. As a result, the moving distance of the substance from the safety valve 221 which is a generation source of the substance can be increased. The center of the discharge path P1 may be, for example, a three-dimensional line obtained by connecting the centers of gravity of flow path cross sections at predetermined positions of the discharge path P1 or may be a portion where a fluid such as a gas flows at the fastest speed when the fluid is made to flow through the discharge path P1.

The discharge path P1 is formed into a shape where a cross-sectional area is increased upwardly toward an outlet side. Accordingly, a substance generated in the inside of the energy storage apparatus 1 can be discharged at an angle inclined upwardly with respect to the Y axis direction, and the substance can be discharged into a wide space in a spreading manner. Accordingly, it is possible to prevent the occurrence of the case where a substance generated in the inside of the energy storage apparatus 1 is discharged in a concentrated manner while maintaining high energy.

When the energy storage apparatus 1 is used in the application such as the power storage or a power source, a plurality of energy storage apparatuses 1 are arranged adjacent to each other on a mounting shelf. To be more specific, the plurality of energy storage apparatuses 1 are arranged adjacent each other on the mounting shelf such that the positive external terminal cover 16 and the negative external terminal cover 17 of each energy storage apparatus 1 shown in FIG. 2 are directed in the same direction (for example, the X axis direction). Usually, a space on the mounting shelf where the energy storage apparatuses 1 are mounted is limited. Another mounting shelf is provided just above the energy storage apparatuses 1 mounted on the mounting shelf. By forming the inclined portion 540 on the inner wall surface of the discharge portion 900, it is possible to prevent the occurrence of the case where a substance discharged through the discharge port 15 directly impinges on another energy storage apparatus 1 arranged adjacent to the energy storage apparatus 1.

(First Modification)

Figure 11A:
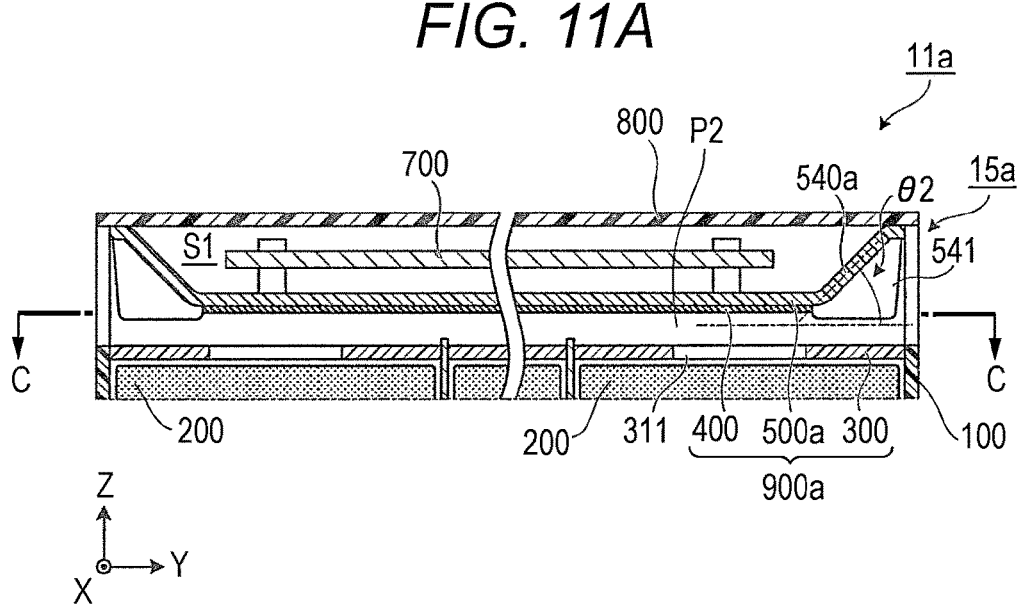
FIG. 11A and FIG. 11B describe a discharge portion according to a first modification of the embodiment of the present invention.
Figure 11B:
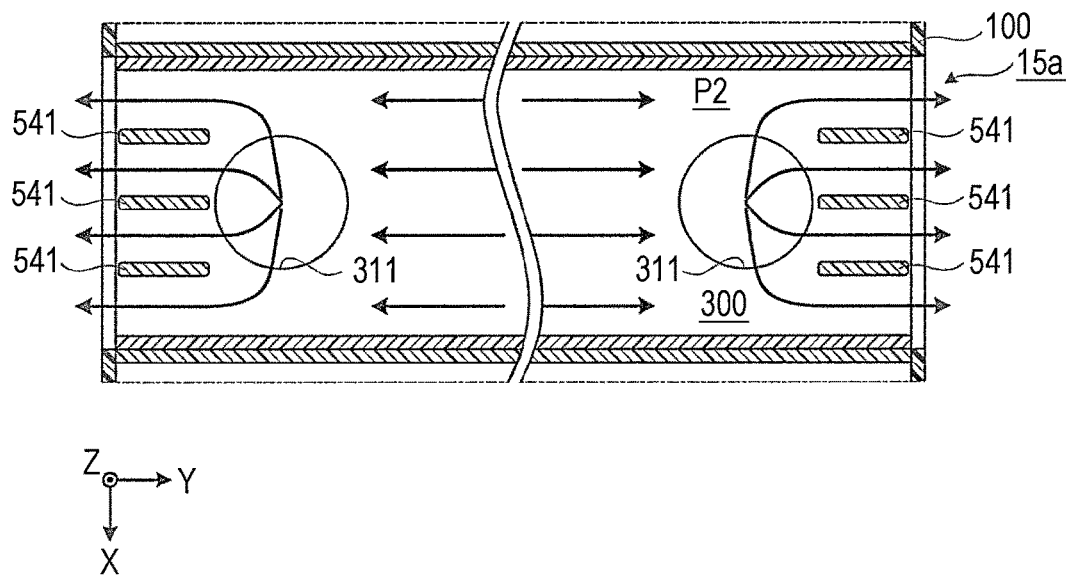

Next, the first modification of the above-mentioned embodiment is described. FIG. 11A and FIG. 11B describe a discharge portion 900a according to the first modification of the embodiment of the present invention. To be more specific, FIG. 11A shows an upper portion of a cross section when a unit module 11a is cut at a position of the cross section of the unit module 11 shown in FIG. 2 along line A-A. FIG. 11B shows a cross section taken along line C-C in FIG. 11A.

As shown in the figures, the unit module 11a according to the first modification differs from the unit module 11 according to the embodiment with respect to a point that the configuration of an inner lid 500a differs from the configuration of the inner lid 500. To be more specific, in the inner lid 500a, a portion which forms a discharge portion 900a is constituted of a flat portion 530 and an inclined portion 540a. That is, the inner lid 500a differs from the inner lid 500 of the above-mentioned embodiment with respect to a point that the inner lid 500a is not provided with the exit flat portion 550. Other configurations are equal to the corresponding other configurations of the unit module 11 according to the embodiment and hence, the description of the other configurations is omitted.

The inclined portion 540a is formed from the more inner side in the Y axis direction than the inclined portion 540 of the inner lid 500 according to the above-mentioned embodiment, and the inclined portion 540a extends to a discharge port 15a at an angle θ2 which is gentler than the inclination angle θ1.

In this manner, in the discharge portion 900a according to the first modification, the inner lid 500a is not provided with the exit flat portion 550 and hence, a discharge path P2 is formed where the inclination angle θ2 of the inclined portion 540a is gentle. Due to such a configuration, a substance such as a gas or a metal piece discharged through a safety valve 221 of an energy storage device 200 can be gradually spread upwardly and hence, the temperature of a discharged substance or the speed of a discharged substance at the time of discharging the substance can be reduced, and it is also possible to prevent the substance from being discharged in a concentrated manner.

The inclination angle of the inclined portion 540 may preferably be set to the following angle.

Figure 12:
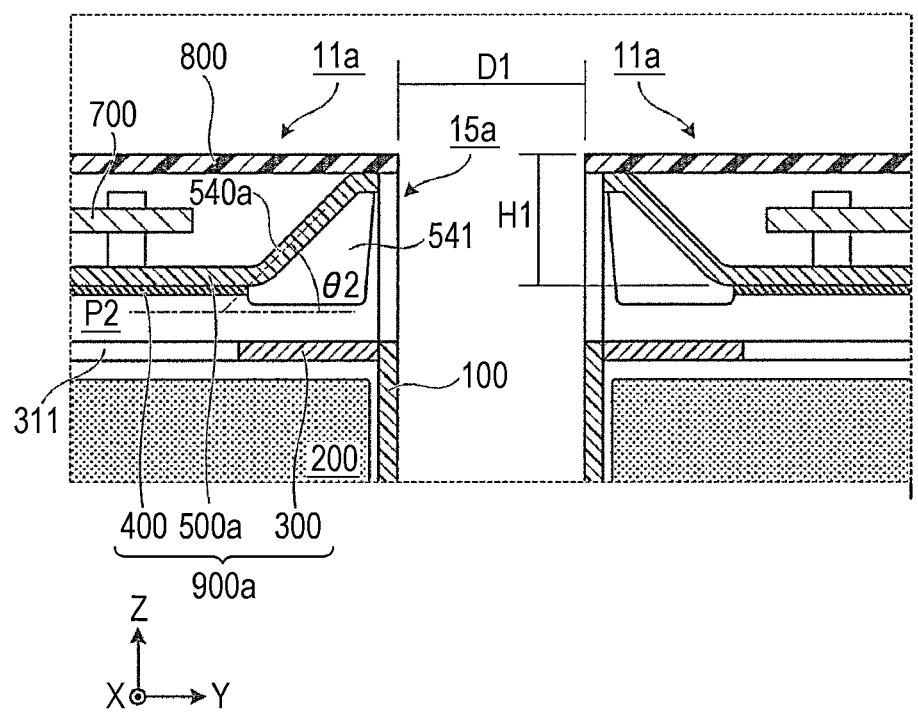
FIG. 12 describes an inclination angle of an inclined portion in the embodiment of the present invention.

FIG. 12 describes an inclination angle of the inclined portion in the embodiment of the present invention. To be more specific, FIG. 12 shows a cross section of a unit module in each energy storage apparatus 1 taken along Y-Z plane which passes the discharge portion when another energy storage apparatus 1 is arranged adjacent to the energy storage apparatus 1 on a Y axis direction side.

As shown in FIG. 12, assume that the energy storage apparatus 1 and another energy storage apparatus 1 are arranged in a spaced-apart manner by a distance D1, and the height from an inner wall surface on an upper side of the flat portion 530 of the discharge portion 900 to an upper surface of the lid member 800 is H1. In this case, it is preferable that an inclination angle θ2 of the inclined portion 540a satisfies the following formula 1.

$$\tan \theta 2 > H1/D1 \qquad \text{(formula 1)}$$

From above, when a substance discharged through the discharge port 15a is discharged at an inclination angle θ2 which satisfies such a formula 1, the substance is discharged while being elevated by the height H1 when the substance moves in the horizontal direction by the distance D1 and hence, the substance can be easily discharged toward au upper side of another energy storage apparatus 1 arranged adjacent to the energy storage apparatus 1. In this manner, it is possible to prevent a substance discharged through the discharge port 15a from directly impinging on another energy storage apparatus 1 arranged adjacent to the energy storage apparatus 1 and hence, it is possible to prevent the substance from adversely affecting another energy storage apparatus 1 arranged adjacent to the energy storage apparatus 1.

It is needless to say that another energy storage apparatus 1 arranged adjacent to the energy storage apparatus 1 is not limited to the energy storage apparatus 1 and may be other electric equipment. Further, although it is preferable that an inclination angle θ2 of the inclined portion 540a formed on the inner lid 500a according to the first modification satisfies the formula 1, the same goes for an inclination angle θ1 of the inclined portion 540 formed on the inner lid 500 according to the embodiment as in the case of the inclination angle θ2.

When the inclined portion is formed such that an inclination angle is changed (for example, is curved or bent) corresponding to the position of the inclined portion in the Y axis direction, an angle at an outermost side of the inclined portion can be used as θ2 in the formula 1.

(Second Modification)

Figure 13A:
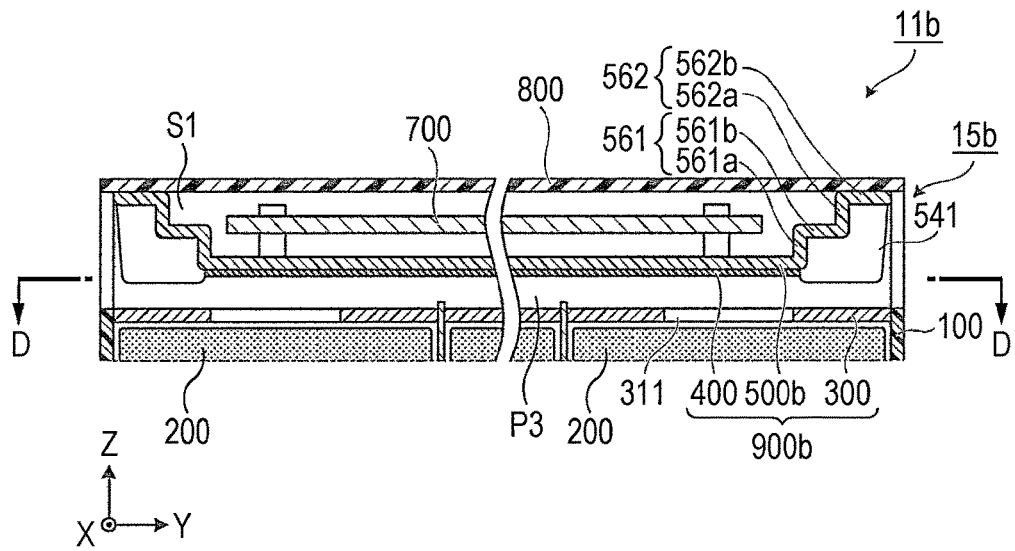
FIG. 13A and FIG. 13B describe a discharge portion according to a second modification of the embodiment of the present invention.
Figure 13B:
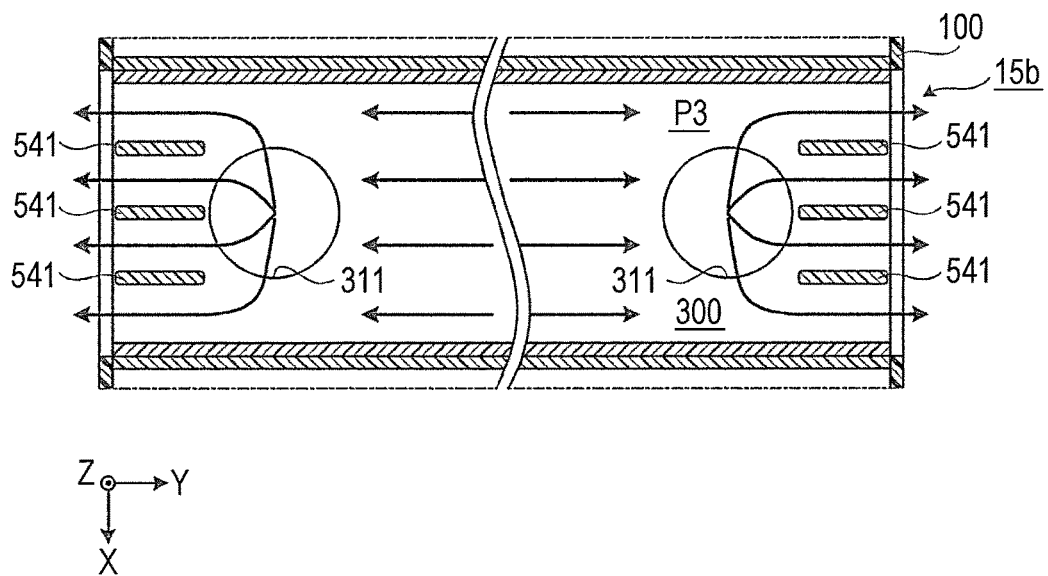

Next, the second modification of the above-mentioned embodiment is described. FIG. 13A and FIG. 13B describe a discharge portion 900b according to the second modification of the embodiment of the present invention. To be more specific, FIG. 13A shows an upper portion of a cross section when a unit module 11b is cut at a position of the cross section of the unit module 11 shown in FIG. 2 along line A-A. FIG. 13B shows a cross section taken along line D-D in FIG. 13A.

As shown in the figures, the unit module 11b according to the second modification differs from the unit module 11a according to the first modification with respect to a point that the configuration of an inner lid 500b differs from the configuration of the inner lid 500a. To be more specific, in the inner lid 500b, a portion which forms a discharge portion 900b is constituted of a flat portion 530, a first enlarged portion 561 and a second enlarged portion 562. That is, the inner lid 500b differs from the inner lid 500a of the first modification with respect to a point that the first enlarged portion 561 and the second enlarged portion 562 are adopted in place of the inclined portion 540a. Other configurations are equal to the corresponding other configurations of the unit module 11a according to the first modification and hence, the description of the other configurations is omitted.

The first enlarged portion 561 is constituted of a first portion 561a extending in the Z axis direction from an end portion of the flat portion 530 in the Y axis direction, and a second portion 561b extending toward a discharge port 15b side of the discharge portion 900b in the Y axis direction from an upper end of the first portion 561a. That is, the first enlarged portion 561 extends in the X axis direction in an L-shaped cross section as shown in FIG. 13A.

The second enlarged portion 562 is constituted of a first portion 562a extending in the Z axis direction from an end portion of the second portion 561b of the first enlarged portion 561, and a second portion 562b extending toward a discharge port 15b side of the discharge portion 900b in the Y axis direction from an upper end of the first portion 562a. That is, the second enlarged portion 562 extends in the X axis direction in an L-shaped cross section as shown in FIG. 13A in the same manner as the first enlarged portion 561.

In this manner, the first enlarged portion 561 and the second enlarged portion 562 are formed at each of both ends of the flat portion 530 of the inner lid 500b in the Y axis direction and hence, a discharge path P3 forms a space enlarged upwardly in a stepwise manner toward the discharge port 15b from the flat portion 530. Accordingly, even when the inclined portion 540a is not formed on the discharge portion 900b, the discharge path P3 is the space which is enlarged in a stepwise manner toward the discharge port 15b and hence, a substance discharged through the safety valve 221 can be discharged upwardly. That is, by forming the discharge path P3 such that the discharge path P3 is enlarged in a stepwise manner in the predetermined direction toward the discharge port 15b (outer side), a substance discharged through the discharge port 15b of the discharge path P3 can be discharged in the predetermined direction. Even in the discharge portion 900b which is formed so as to be enlarged in a stepwise manner as in the case of the first enlarged portion 561 and the second enlarged portion 562, the first portion 561a of the first enlarged portion 561 and the first portion 562a of the second enlarged portion 562 have a wall surface which is inclined at an approximately 90 degrees.

(Third Modification)

Figure 14A:
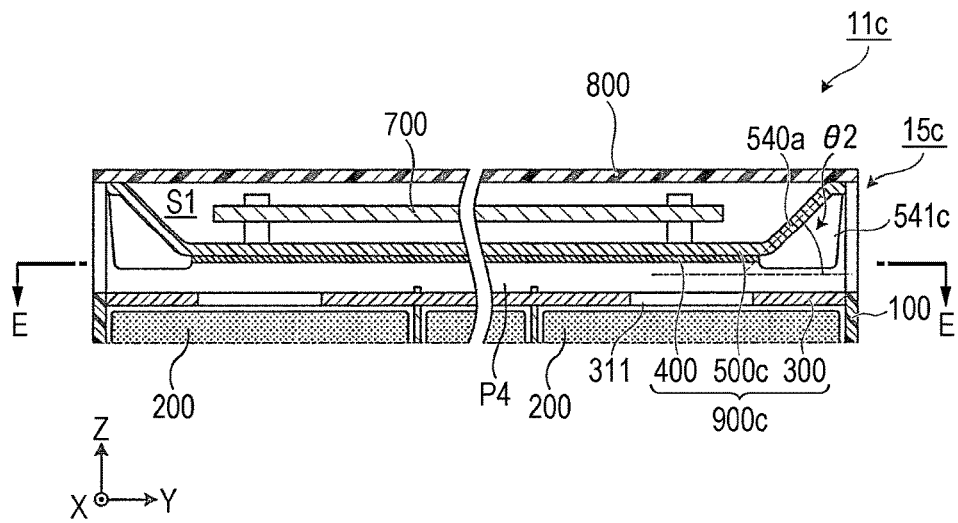
FIG. 14 A and FIG. 14B describe a discharge portion according to a third modification of the embodiment of the present invention.
Figure 14B:
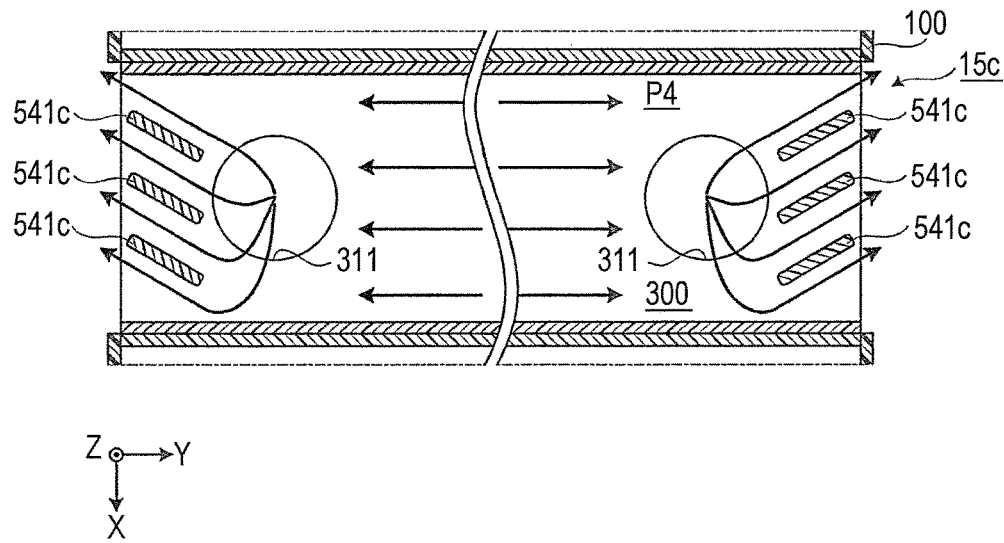

Next, the third modification of the above-mentioned embodiment is described. FIG. 14A and FIG. 14B describe a discharge portion 900c according to the third modification of the embodiment of the present invention. To be more specific, FIG. 14A shows an upper portion of a cross section when a unit module 11c is cut at a position of the cross section of the unit module 11 shown in FIG. 2 along line A-A. FIG. 14B shows a cross section taken along line E-E in FIG. 14A.

As shown in the figures, the unit module 11c according to the third modification differs from the unit module 11a according to the first modification with respect to a point that the configuration of an inner lid 500c differs from the configuration of the inner lid 500a. To be more specific, the inner lid 500c differs from the inner lid 500a of the first modification with respect to a point that a plurality of ribs 541c are formed in an inclined manner toward a plus side in the X axis direction toward a discharge port 15c side of the discharge portion 900c. Other configurations are equal to the corresponding other configurations of the unit module 11a according to the first modification and hence, the description of the other configurations is omitted.

In this manner, in the discharge portion 900c according to the third modification, the plurality of ribs 541c formed on the inclined portion 540a are formed in an inclined manner toward a plus side in the X axis direction toward the discharge port 15c side of the discharge path P4 and hence, a substance discharged through a safety valve 221 can be discharged toward a plus side in the X axis direction in addition to directing the substance upwardly. Accordingly, even when electric equipment is arranged adjacent to an energy storage apparatus, a substance can be discharged in the inclination direction and hence, it is possible to increase a distance of a path through which a substance passes to the electric equipment arranged adjacent to the energy storage apparatus. As a result, it is possible to prevent the occurrence of the case where a substance is discharged toward the electric equipment arranged adjacent to the energy storage apparatus while maintaining high energy. Further, even when the electric equipment arranged adjacent to the energy storage apparatus is another energy storage apparatus, a substance can be discharged in the inclination direction and hence, it is possible to prevent the substance from directly entering a discharge port formed in another electric equipment.

(Fourth Modification)

Figure 15A:
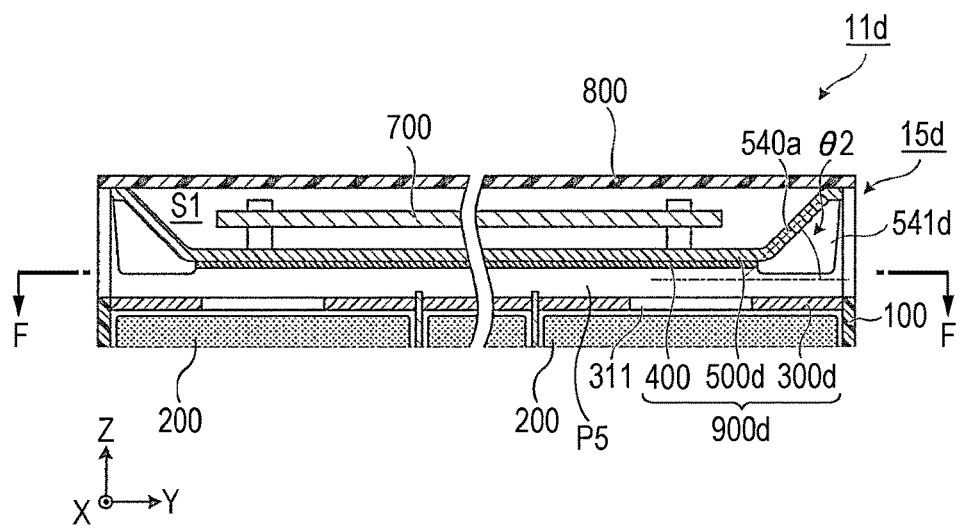
FIG. 15 A and FIG. 15B describe a discharge portion according to a fourth modification of the embodiment of the present invention.
Figure 15B:
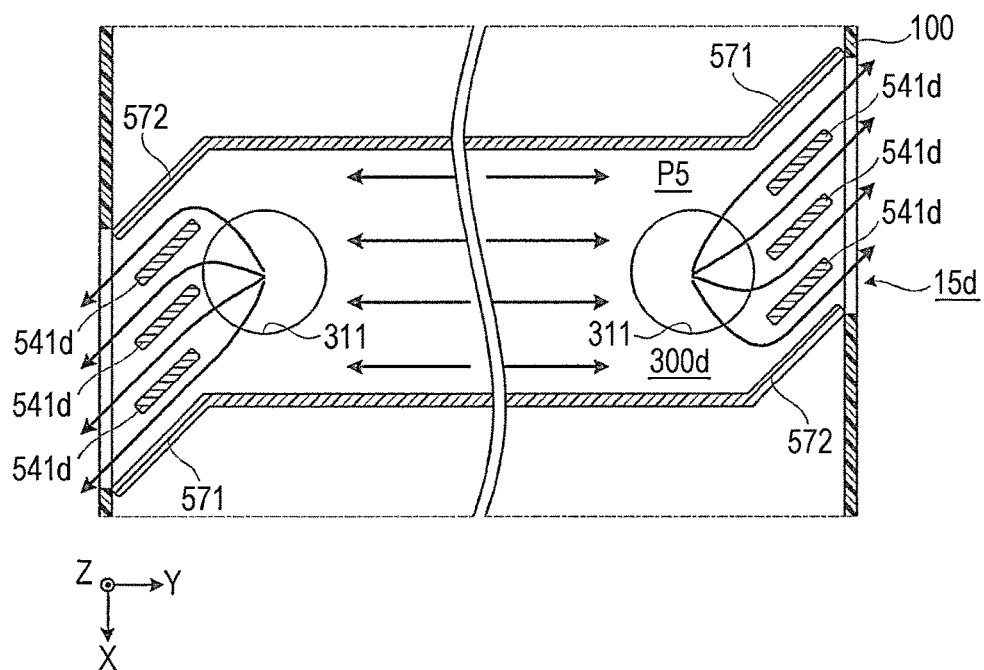

Next, the fourth modification of the above-mentioned embodiment is described. FIG. 15A and FIG. 15B describe a discharge portion 900d according to the fourth modification of the embodiment of the present invention. To be more specific, FIG. 15A shows an upper portion of a cross section when a unit module 11d is cut at a position of the cross section of the unit module 11 shown in FIG. 2 along line A-A. FIG. 15B shows a cross section taken along line F-F in FIG. 15A.

As shown in the figures, the unit module 11d according to the fourth modification differs from the unit module 11a according to the first modification with respect to a point that the configurations of an inner lid 500d, a heat insulation member 400d, a flow path forming portion 300d and an outer covering body 100d differ from the configurations of the inner lid 500a, the heat insulation member 400, the flow path forming portion 300 and the outer covering body 100. To be more specific, as shown in FIG. 15B, in a region of an inclined portion 540a formed on the inner lid 500d, the discharge portion 900d is configured to be inclined toward a plus side in the X axis direction toward a discharge port 15d of the discharge portion 900d on a plus side in the Y axis direction, and is configured to be inclined toward a minus side in the X axis direction toward the discharge port 15d of the discharge path P5 on a minus side in the Y axis direction. That is, as viewed in a top plan view, the discharge portion 900d is configured to be inclined toward one side in the X axis direction in the region of the discharge portion 900d where the inclined portion 540a is formed such that the discharge portion 900d has a point symmetrical shape. To be more specific, the discharge portion 900d includes a first side surface 571 and a second side surface 572 inclined toward one side in the X axis direction in the region where the inclined portion 540a is formed. In other words, in the region of the discharge portion 900d on an outlet side, not only the inclined portion 540a which constitutes an upper wall surface is formed in an inclined manner but also the first side surface 571 and the second side surface 572 which constitute side wall surfaces are also formed in an inclined manner with respect to the Y axis direction. Further, a plurality of ribs 541d formed on the inclined portion 540a are also formed in an inclined manner along the inclination toward one side in the X axis direction in the region of the discharge portion 900d where the inclined portion 540a is formed.

In this manner, in the discharge portion 900d according to the fourth modification, the region where the inclined portion 540a is formed and the first side surface formed on the inclined portion 540a are formed in an inclined manner toward one side in the X axis direction toward the discharge port 15d of the discharge portion 900d and hence, a substance can be discharged by directing the flow of the discharged substance toward one side in the X axis direction. Accordingly, it is possible to prevent the occurrence of the case where a substance discharged through the discharge port 15d is discharged toward electric equipment arranged adjacent to the energy storage apparatus 1 while maintaining high energy.

Figure 16:
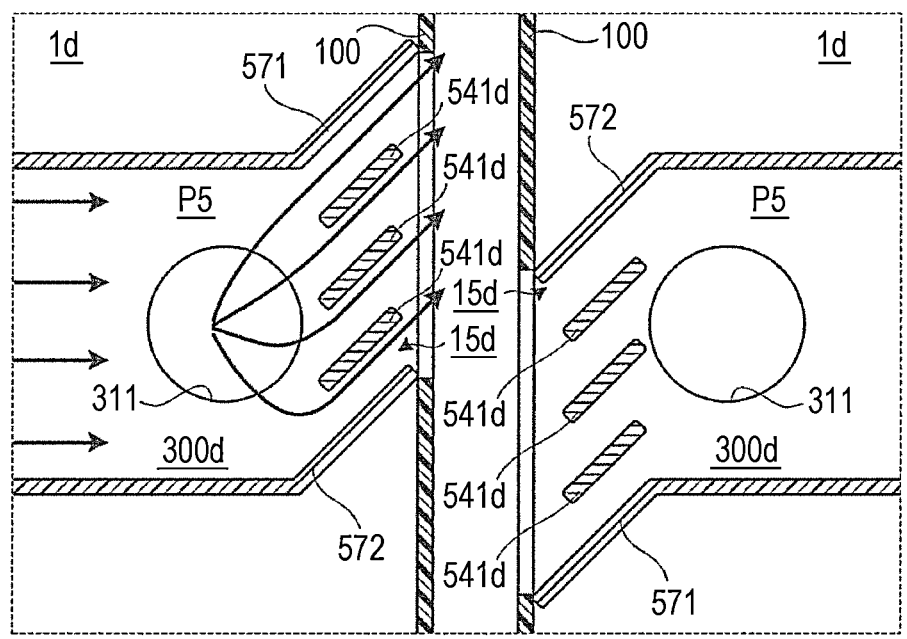
FIG. 16 describes an advantageous effect acquired by arranging a plurality of energy storage apparatuses of the fourth modification of the embodiment of the present invention next to each other.

Further, when a plurality of energy storage apparatuses 1d which adopt the discharge portion 900d of the fourth modification are arranged next to each other, the following advantageous effect can be acquired. FIG. 16 describes the advantageous effect acquired by arranging a plurality of energy storage apparatuses 1d of the fourth modification of the embodiment of the present invention.

As shown in FIG. 16, both ends of the discharge portion 900d in the Y axis direction are formed in an inclined manner toward one side in the X axis direction such that the discharge portion 900d has a point symmetry as viewed in a top plan view. Accordingly, when the energy storage apparatus 1d and another energy storage apparatus 1d are arranged next to each other, the discharge port 15d of the discharge portion 900d of another energy storage apparatus 1d is not present in the direction that the discharge port 15d of the discharge portion 900d of one energy storage apparatus 1d is directed, and the outer covering body 100 is present in such a direction. Accordingly, even when a substance is discharged through the discharge port 15d of the discharge portion 900d of one energy storage apparatus 1d, it is possible to prevent the substance discharged from one energy storage apparatus 1d from entering the inside of the discharge port 15d of the discharge portion 900d of another energy storage apparatus 1d. Accordingly, it is possible to reduce an adverse effect caused by entering of the substance into the inside of the energy storage apparatus 1d through the discharge port 15d of the discharge portion 900d of the energy storage apparatus 1d.

(Fifth Modification)

Figure 17A:
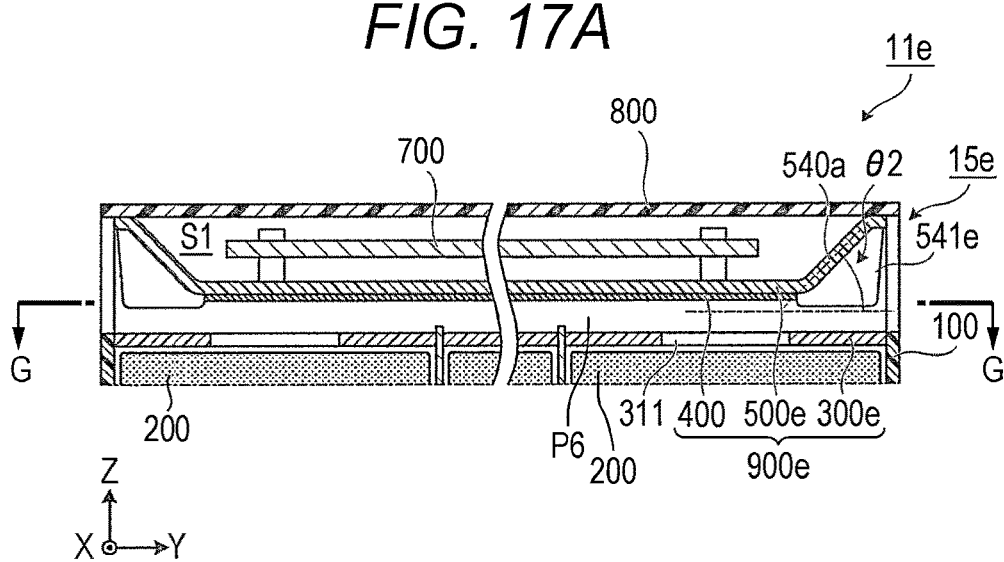
FIG. 17A and FIG. 17B describe a discharge portion according to a fifth modification of the embodiment of the present invention.
Figure 17B:
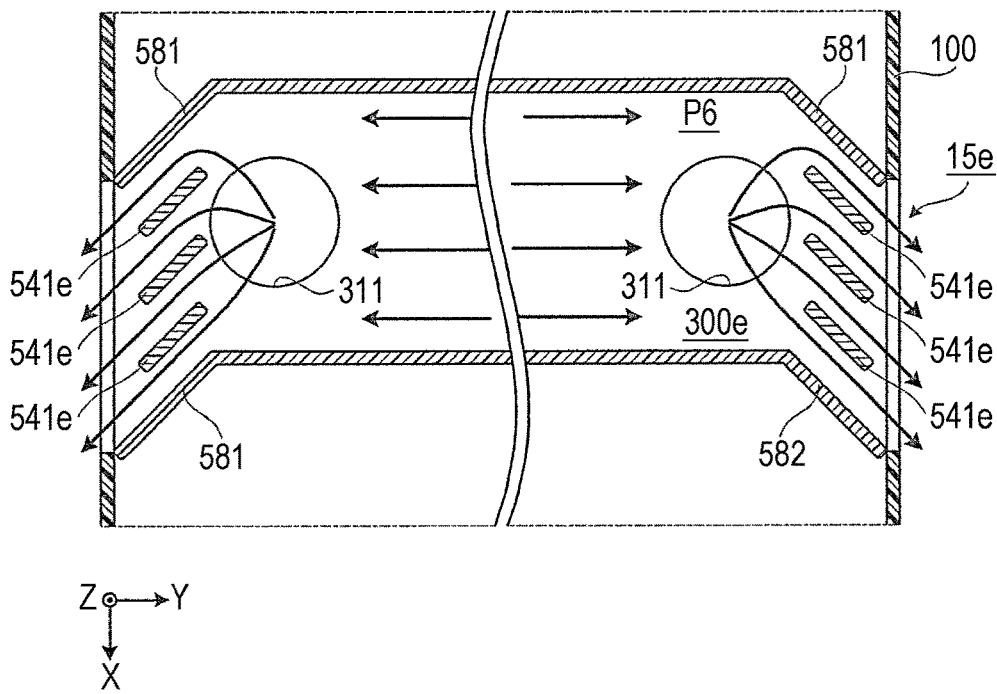

Next, the fifth modification of the above-mentioned embodiment is described. FIG. 17A and FIG. 17B describe a discharge portion 900e according to the fifth modification of the embodiment of the present invention. To be more specific, FIG. 17A shows an upper portion of a cross section when a unit module 11e is cut at a position of the cross section of the unit module 11 shown in FIG. 2 along line A-A. FIG. 17B shows a cross section taken along line G-G in FIG. 17A.

As shown in the figures, the unit module 11e according to the fifth modification differs from the unit module 11d according to the fourth modification with respect to a point that the configurations of an inner lid 500e, a heat insulation member 400e, a flow path forming portion 300e and an outer covering body 100e differ from the configurations of the inner lid 500d, the heat insulation member 400d, the flow path forming portion 300d and the outer covering body 100d. To be more specific, as shown in FIG. 17B, in a region of an inclined portion 540a formed on the inner lid 500e, the discharge portion 900e is configured to be inclined toward a minus side in the X axis direction toward a discharge port 15e of the discharge path P6. That is, as viewed in a top plan view, the discharge portion 900e is configured to be inclined toward one side in the X axis direction in the region of the discharge portion 900e where the inclined portion 540a is formed such that the discharge portion 900e has a line symmetrical shape. To be more specific, the discharge portion 900e includes a first side surface 581 and a second side surface 582 inclined toward one side in the X axis direction in the region where the inclined portion 540a is formed. In other words, in the region of the discharge portion 900e on an outlet side, not only the inclined portion 540a which constitutes an upper wall surface is formed in an inclined manner but also the first side surface 581 and the second side surface 582 which constitute side wall surfaces are also formed in an inclined manner with respect to the Y axis direction. Further, a plurality of ribs 541e formed on the inclined portion 540a are also formed in an inclined manner along the inclination toward one side in the X axis direction in the region of the discharge portion 900e where the inclined portion 540a is formed.

In this manner, in the discharge portion 900e according to the fifth modification, the region where the inclined portion 540a is formed and the plurality of ribs 541e formed on the inclined portion 540a are formed in an inclined manner toward one side in the X axis direction toward the discharge port 15e of the discharge portion 900e and hence, a substance can be discharged by directing the flow of the discharged substance toward one side in the X axis direction. Accordingly, it is possible to prevent the occurrence of the case where a substance discharged through the discharge port 15e is discharged toward electric equipment arranged adjacent to the energy storage apparatus 1 while maintaining high energy.

Figure 18:
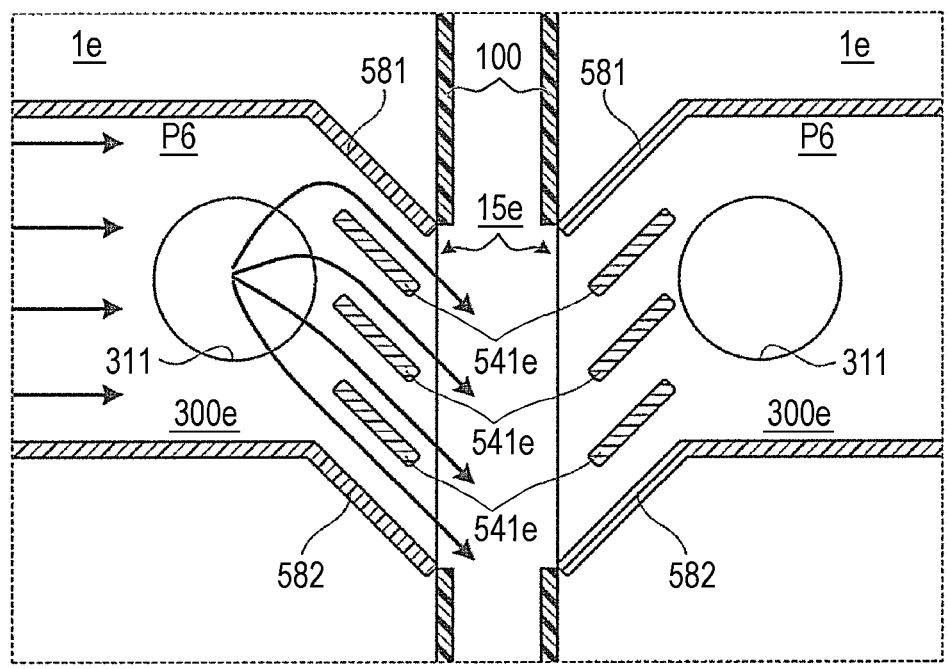
FIG. 18 describes an advantageous effect acquired by arranging a plurality of energy storage apparatuses of the fifth modification of the embodiment of the present invention next to each other.

Further, when a plurality of energy storage apparatuses 1e which adopt the discharge portion 900e of the fifth modification are arranged next to each other, the following advantageous effect can be acquired. FIG. 18 describes the advantageous effect acquired by arranging a plurality of energy storage apparatuses 1e of the fifth modification of the embodiment of the present invention.

As shown in FIG. 18, both ends of the discharge portion 900e in the Y axis direction are formed in an inclined manner toward a minus side in the X axis direction such that the discharge portion 900e has a line symmetry as viewed in a top plan view. Accordingly, when the energy storage apparatus 1e and another energy storage apparatus 1e are arranged next to each other, the plurality of ribs 541e and the second side surface 582 are formed in the direction which intersects with the direction along which the discharge port 15e of the discharge portion 900e of one energy storage apparatus 1e is directed. Due to such a configuration, even when a substance is discharged through the discharge port 15e of the discharge portion 900e of one energy storage apparatus 1e, although the substance reaches the discharge port 15e of the discharge portion 900e of another energy storage apparatus 1e, the flow of the substance is obstructed by the plurality of ribs 541e and the second side surface 582 due to the formation of the plurality of ribs 541e and the second side surface 582 in the direction which intersects with the discharge direction of the substance. Accordingly, it is possible to prevent the substance discharged from one energy storage apparatus 1e from entering the inside of the discharge portion 900e of another energy storage apparatus 1e. Accordingly, it is possible to reduce an adverse effect caused by entering of the substance into the inside of the energy storage apparatus 1e through the discharge port 15e of the discharge portion 900e of the energy storage apparatus 1e.

Although the energy storage apparatus according to the embodiment of the present invention has been described heretofore, the present invention is not limited to the above-mentioned embodiment. That is, it should be construed that the embodiment disclosed herein is merely illustrative but not restrictive in all aspects. The scope of the present invention is not designated by the above-mentioned description but is designated by claims, and it is intended that all modifications which fall within the meaning and the scope equivalent to claims are also included in the scope of the present invention. Further, the configurations which are made by combining any components which the above-mentioned embodiment includes are also included in the scope of the present invention.

For example, in the modifications 4 and 5, the discharge portions 900d, 900e are formed by inclining the inclined portion 540a, the first side surfaces 571, 581 and the second side surfaces 572, 582. However, the present invention is not limited to such a configuration, and the inclined portion 540a does not need to be formed. Although both the first side surfaces 571, 581 and the second side surfaces 572, 582 are inclined in the discharge portions 900d, 900e, only one side surface may be inclined. Further, these configurations may be combined with each other as desired.

In the above-mentioned embodiment, the inclined portion 540 is inclined in the direction that the space of the discharge path P1 is widened. However, the present invention is not limited to such a configuration, and the direction of the flow of a substance discharged from the inside can be also inclined by inclining the inclined portion 540 in the direction that the space of the discharge path is narrowed, and such a configuration also can acquire the same advantageous effect. However, by inclining the inclined portion 540 in the direction that the space of the discharge path is widened, it is also possible to acquire an advantageous effect that a substance spreads and hence, such a configuration is effective.

In the above-mentioned embodiment and modifications 1 to 5, the configuration is adopted where the surface of the flow path forming portion 300, 300d, 300e which faces the inclined portion 540, 540a is not inclined with respect to the Y axis direction. However, the surface of the flow path forming portion 300, 300d, 300e may be inclined with respect to the Y axis direction. When the surface of the flow path forming portion 300, 300d, 300e which faces the inclined portion 540, 540a is inclined with respect to the Y axis direction, the surface of the flow path forming portion 300, 300d, 300e may be inclined downwardly at the same angle as the inclination angle $\theta 1$, $\theta 2$ of opposedly facing inclined portion 540, 540a, may be inclined downwardly at an angle different from the inclination angle $\theta 1$, $\theta 2$, or may be inclined upwardly. In this case, from a viewpoint of achieving an aim of enlarging the discharge port 15, 15a to 15e, it is preferable that the surface of the flow path forming portion 300, 300d, 300e which faces the inclined portion 540, 540a be inclined downwardly. Further, to achieve an aim of enlarging the discharge port 15, 15a to 15e and discharging a substance in an obliquely upward direction, it is desirable that the surface of the flow path forming portion 300, 300d, 300e be inclined downwardly at an angle smaller than the inclination angle $\theta 1$, $\theta 2$.

In the above-mentioned embodiment and modifications, the configuration is adopted where the inner wall surface of the discharge portion on an upper side has the inclined portion 540, 540a which is inclined more upwardly toward an outlet side. However, the inclined inner wall surface is not limited to the inner wall surface of the discharge portion on an upper side, and it is sufficient that the configuration is provided where any one of inner wall surfaces of the discharge portion has an inclined surface which is inclined more in the predetermined direction toward the outlet side.

Due to such a configuration, at least part of a substance discharged through the discharge port can be discharged in an inclined manner in the predetermined direction and hence, a moving distance of the substance from the safety valve which is a generation source of the substance can be increased.

Further, the configuration may be adopted where the first wall surface and the second wall surface which face each other among the inner wall surfaces of the discharge portion have different angles with respect to the Y axis direction. That is, only the first wall surface may be inclined with respect to the Y axis direction. Provided that an inclination angle at which the first wall surface is inclined with respect to the Y axis direction differs from an inclination angle at which the second wall surface is inclined with respect to the Y axis direction, both the first wall surface and the second wall surface may be inclined with respect to the Y axis direction. It is needless to say that the first wall surface and the second wall surface are not limited to the inner wall surface on an upper side and the inner wall surface on the lower surface. That is, the first wall surface and the second wall surface may be inner wall surfaces of two portions which face each other in an X axis direction or may be inner wall surfaces of two portions which face each other in the direction inclined with respect to the Z axis direction.

Due to such a configuration, at least part of a substance discharged through the discharge port can be discharged in an inclined manner in the direction that the wall surface having a larger inclination angle with respect to the Y axis direction is inclined out of the first wall surface and the second wall surface and hence, a moving distance of the substance from the safety valve can be increased.

In the above-mentioned embodiment and modifications of the embodiment, the inclined portion 540, 540a is formed on the inner wall surface of the discharge portion 900, 900a to 900e on an outlet side. However, the portion where the inclined portion 540, 540a is formed is not limited to the inner wall surface on an outlet side, and the inclined portion 540, 540a may be formed at any position in the discharge path P1 to P6 of the discharge portion 900, 900a to 900e.

In the above-mentioned embodiment and modifications, the ribs 541, 541c to 541e are formed on the discharge portion 900, 900a to 900e. However, the ribs do not need to be formed on the discharge portion 900, 900a to 900e.

In the above-mentioned embodiment and modifications, the flat inclined surfaces are illustrated as the inclined portion 540, 540a. However, the inclined portion 540, 540a may be formed into a curved shape.

In the above-mentioned embodiment and modifications, the flow path arrangement portion is formed of the inner lid 500. However, the flow path arrangement portion is not limited to the inner lid 500. For example, the flow path arrangement portion may be any portion provided that the flow path arrangement portion is arranged at the position where air discharged through the safety valve 221 passes such as an outer lid or the discharge duct.

The present invention is applicable to an energy storage apparatus or the like where one or more energy storage devices are accommodated in an outer covering.

What is claimed is:

1. An energy storage apparatus comprising:
energy storage devices arranged in a first direction each of the energy storage devices including a positive terminal and a negative terminal projecting in a second direction perpendicular to the first direction;
an electric member electrically connected with the energy storage devices, the electric member being arranged between the positive terminal and the negative terminal; and
an outer covering which houses the energy storage devices and the electric member, wherein
the outer covering has a discharge portion forming a discharge path which discharges a substance generated in an inside of the energy storage apparatus toward outside of the outer covering in the first direction, and an inner wall surface of the discharge portion includes a first wall surface which is, in a cross sectional view taken along a plane including the first and second directions, inclined with respect to the first direction,
in the cross sectional view taken along the plane including the first and second directions, the electric member is opposed to the first wall surface in the first direction, and
ribs are formed on an outlet side of the discharge portion, the ribs being arranged with an interval in a third direction perpendicular to the first and second directions such that each rib is raised from an inner surface of the discharge portion on the outlet side of the discharge portion.

2. The energy storage apparatus according to claim 1, wherein
electric equipment is arranged on a side of the outer covering on the outlet side of the discharge portion.

3. The energy storage apparatus according to claim 1, wherein
the inner wall surface of the discharge portion includes a second wall surface which faces the first wall surface, and
an angle which the first wall surface makes with respect to the first direction differs from an angle which the second wall surface makes with respect to the first direction.

4. The energy storage apparatus according to claim 1, wherein
the discharge portion is formed in a space formed in the inside of the outer covering.

5. The energy storage apparatus according to claim 1, wherein
the discharge portion is formed at an upper portion of a side surface of the outer covering so as to discharge the substance in a horizontal direction as the first direction, and
the first wall surface is inclined upwardly with respect to the first direction.

6. The energy storage apparatus according to claim 1, further comprising:
a flow path forming portion, wherein
the outer covering includes an outer covering body which houses the plurality of energy storage devices and an inner lid which is arranged above the plurality of energy storage devices, and
the flow path forming portion is arranged on a surface of the inner lid which faces the energy storage devices in a state where the flow path forming portion straddles over the plurality of energy storage devices, and the discharge portion is formed by the inner lid and the flow path forming portion so as to discharge a substance in a horizontal direction which constitutes the first direction.

7. The energy storage apparatus according to claim 6, wherein
the first wall surface is arranged in a vicinity of the outlet of the discharge portion.

8. An energy storage apparatus comprising:
energy storage devices arranged in a first direction, each of the energy storage devices including a positive terminal and a negative terminal projecting in a second direction perpendicular to the first direction; and
an outer covering which houses the energy storage devices, wherein
the outer covering has a discharge portion forming a discharge path which discharges a substance from the energy storage device toward outside of the outer covering in the first direction, and an inner wall surface of the discharge portion includes a first wall surface which is, in a cross sectional view taken along a plane including the first and second directions, inclined with respect to the first direction, and
ribs are formed on an outlet side of the discharge portion, the ribs being arranged with an interval in a third direction perpendicular to the first and second directions such that each rib extends along the discharge path in the first direction and is raised from an inner surface of the discharge portion on the outlet side of the discharge portion.

9. The energy storage apparatus according to claim 8, wherein
the ribs are formed on the first wall surface.

10. The energy storage apparatus according to claim 8, further comprising a bus bar, wherein the outer covering includes an outer covering body, which houses the energy storage devices, and an inner lid which is arranged above the energy storage devices, the inner lid has openings through which the positive terminals and the negative terminals of the energy storage devices are exposed, the positive terminal and the negative terminal of one energy storage device being connected to those of another energy storage device by the bus bar, and the inner lid includes the first wall surface and the ribs.

11. The energy storage apparatus according to claim 10, wherein the discharge path is formed between the inner lid and the energy storage devices.

12. The energy storage apparatus according to claim 10, wherein the discharge path is formed beneath the inner lid.

13. The energy storage apparatus according to claim 10, further comprising a printed circuit board extending in the first and third directions above the inner lid.

14. An energy storage apparatus comprising:

a bus bar;

energy storage devices arranged in a first direction, each of the energy storage devices including a positive terminal and a negative terminal projecting in a second direction perpendicular to the first direction; and an outer covering which houses the energy storage devices, wherein the outer covering includes a discharge portion forming a discharge path which discharges a substance from the energy storage device toward outside of the outer covering in the first direction, and an inner wall surface of the discharge portion includes a first wall surface which is, in a cross sectional view taken along a plane including the first and second directions, inclined with respect to the first direction, ribs are formed on an outlet side of the discharge portion, the ribs being arranged with an interval in a third direction perpendicular to the first and second directions such that each rib is raised from an inner surface of the discharge portion on the outlet side of the discharge portion, the outer covering includes an outer covering body, which houses the energy storage devices, and an inner lid which is arranged above the energy storage devices, the inner lid has openings through which the positive terminals and the negative terminals of the energy storage devices are exposed, the positive terminal and the negative terminal of one energy storage device being connected to those of another energy storage device by the bus bar, and the inner lid includes the first wall surface and the ribs.

15. The energy storage apparatus according to claim 14, wherein the ribs are formed on the first wall surface.

16. The energy storage apparatus according to claim 14, wherein the discharge path is formed between the inner lid and the energy storage devices.

17. The energy storage apparatus according to claim 14, wherein the discharge path is formed beneath the inner lid.

18. The energy storage apparatus according to claim 14, further comprising:

a printed circuit board extending in the first and third directions above the inner lid.

19. The energy storage apparatus according to claim 14, wherein each rib extends along the discharge path in the first direction.

* * * * *